(12) United States Patent
Huang et al.

(10) Patent No.: US 10,586,984 B2
(45) Date of Patent: Mar. 10, 2020

(54) ELECTRODE COMPOSITION

(71) Applicant: Anteo Technologies Pty Ltd, Eight Mile Plains QLD (AU)

(72) Inventors: Chang-Yi Huang, Casuarina Crescent (AU); Quansheng Song, Forest Lake (AU); Nobuyoshi Joe Maeji, Wishart (AU)

(73) Assignee: ANTEO TECHNOLOGIES PTY LTD., Queensland (AU)

( * ) Notice: Subject to any disclaimer, the term of this patent is extended or adjusted under 35 U.S.C. 154(b) by 154 days.

(21) Appl. No.: 15/567,533

(22) PCT Filed: Apr. 19, 2016

(86) PCT No.: PCT/AU2016/050284
§ 371 (c)(1),
(2) Date: Oct. 18, 2017

(87) PCT Pub. No.: WO2016/168892
PCT Pub. Date: Oct. 27, 2016

(65) Prior Publication Data
US 2018/0097233 A1 Apr. 5, 2018

(30) Foreign Application Priority Data
Apr. 20, 2015 (AU) .................. 2015901413

(51) Int. Cl.
H01M 4/58 (2010.01)
H01G 11/46 (2013.01)
(Continued)

(52) U.S. Cl.
CPC .......... H01M 4/5825 (2013.01); H01G 4/008 (2013.01); H01G 11/30 (2013.01);
(Continued)

(58) Field of Classification Search
CPC ...... H01M 4/5825; H01M 4/62; H01M 4/525; H01M 4/505; H01M 4/386; H01M 4/364;
(Continued)

(56) References Cited

U.S. PATENT DOCUMENTS

2008/0050642 A1 2/2008 Dressick et al.
2008/0051281 A1 2/2008 Dressick et al.
(Continued)

FOREIGN PATENT DOCUMENTS

| EP | 1 689 011 A1 | 8/2006 |
| KR | 20020087600 A | 11/2002 |
| WO | WO 2014/144046 A1 | 9/2014 |

OTHER PUBLICATIONS

International Preliminary Report on Patentability issued in International Application No. PCT/AU2016/050284, dated Jun. 6, 2016.
(Continued)

*Primary Examiner* — Stewart A Fraser
(74) *Attorney, Agent, or Firm* — Charles C. Achkar; Ostrolenk Faber LLP.

(57) ABSTRACT

The present invention describes the use of metal-ligand complexes within the active material of an electrode to provide for improvement in operation as well as to mitigate the cyclic stresses of swelling of the active material during charging and discharging operations and to provide resistance to dissolution of electrode active materials.

22 Claims, 6 Drawing Sheets

(51) Int. Cl.

| | |
|---|---|
| *H01M 4/38* | (2006.01) |
| *H01G 11/32* | (2013.01) |
| *H01M 4/36* | (2006.01) |
| *H01M 4/505* | (2010.01) |
| *H01G 11/42* | (2013.01) |
| *H01M 4/62* | (2006.01) |
| *H01M 4/525* | (2010.01) |
| *H01G 11/30* | (2013.01) |
| *H01M 4/583* | (2010.01) |
| *H01M 10/42* | (2006.01) |
| *H01G 4/008* | (2006.01) |
| *H01M 10/052* | (2010.01) |

(52) U.S. Cl.
CPC ............ *H01G 11/32* (2013.01); *H01G 11/42* (2013.01); *H01G 11/46* (2013.01); *H01M 4/364* (2013.01); *H01M 4/366* (2013.01); *H01M 4/386* (2013.01); *H01M 4/505* (2013.01); *H01M 4/525* (2013.01); *H01M 4/583* (2013.01); *H01M 4/62* (2013.01); *H01M 4/628* (2013.01); *H01M 10/4235* (2013.01); *H01M 10/052* (2013.01)

(58) Field of Classification Search
CPC .. H01M 4/583; H01M 4/366; H01M 10/4235; H01M 4/628; H01G 11/46; H01G 11/42; H01G 11/32; H01G 11/30; H01G 4/008
See application file for complete search history.

(56) References Cited

U.S. PATENT DOCUMENTS

| | | | |
|---|---|---|---|
| 2014/0030573 A1 | 1/2014 | Esswein et al. | |
| 2014/0186253 A1* | 7/2014 | Kitagawa | C07C 65/03 |
| | | | 423/362 |
| 2014/0272570 A1* | 9/2014 | Caldwell | H01M 4/366 |
| | | | 429/213 |
| 2015/0065339 A1 | 3/2015 | Bloomfield et al. | |
| 2016/0293938 A1* | 10/2016 | Takeuchi | H01B 1/127 |

OTHER PUBLICATIONS

International Search Report issued in International Application No. PCT/AU2016/050284, dated Jun. 6, 2016.
Written Opinion of the International Searching Authority issued in International Application No. PCT/AU2016/050284, dated Jun. 6, 2016.
A. Aramata et al., "Ligand grafting method for immobilization of metal complexes on a carbon electrode", www.elsevier.com, Thin Solid Films 424 (2003) 239-246, XNPL-0040-6090-242-2-239, Published on Jan. 31, 2003.
El-Sharif M et al "Electrodeposition of Thick Chromium Coatings From an Environmentally Acceptable Chromium (III)-Glycine Complex", Transactions of the Institute of Metal Finishing, Maney Publishing, Birmingham, GB, vol. 77, No. PART 04, Jul. 1, 1999 (Jul. 1, 1999), pp. 139-144, XP000833448, ISSN: 0020-2967.
Extended EP Search Report issued in counterpart EP application No. 16782396.2, dated Oct. 17, 2018.

* cited by examiner

ELECTRODE COMPOSITION

CROSS REFERENCE TO RELATED APPLICATIONS

The present application is a § 371 National Phase application based on PCT/AU2016/050284 filed Apr. 19, 2016, which claims the benefit of Australian application No. 2015901413 filed Apr. 20, 2015 the subject matter of each of which is incorporated by reference in their entirety.

FIELD OF THE INVENTION

The invention relates to an electrode composition and methods for preparing an electrode composition.

BACKGROUND OF THE INVENTION

There is a need for simple processes to improve the performance of electromaterials such as for batteries or capacitors and supercapacitors, as well as other energy storage and conversion systems. One such example is silicon based anodes in lithium-ion batteries which are regarded as a very promising technology due to having a higher theoretical energy storage densities (3,400-4,200 mAh/g) when compared to conventional graphite lithium cells (350-370 mAh/g).

The capacity of a lithium-ion battery is determined by how many lithium ions can be stored in the cathode and anode. Using silicon in the anode, with carbon particles to assist in conductivity, the battery's capacity increases dramatically because one silicon atom can bond up to 3.75 lithium ions, whereas with a graphite anode six carbon atoms are needed for every lithium atom.

Unfortunately the consequence of this increase in capacity is that during the charge/discharge cycle the silicon in the anode swells and shrinks by up to 400%. Repeated expansion and contraction of this order upon charge/discharge leads to destabilisation of the structure. This leads to reduced capacity and a shorter battery life as the silicon electrode loses stability in a short number of recharge cycles and physically deteriorates. The challenges of maintaining dimensional stability on lithiation exist for all types of silicon materials including its various oxides, composites and alloys. Other examples of electrode active materials having similar expansion/contraction characteristics on charge/discharge include tin- and germanium-based anode materials as well as sulphur-based cathode materials.

Maintaining structural integrity of anode active materials during charge/discharge isn't the only limitation encountered with electrode materials. New cathode active materials having higher energy densities also have resulting integrity problems. Manganese and/or nickel dissolution occurs in cathodes based on lithium manganese nickel oxide materials. Apart from structural loss, such dissolution by the electrolyte can lead to formation of thick Solid Electrolyte Interphase (SEI) layers and consumption of electrolyte. Both of these issues limit battery performance and cycle life.

The present invention addresses at least some of the aforementioned shortcomings of the prior art.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

SUMMARY OF THE INVENTION

In one aspect of the invention there is provided an electrode including: an active material having a surface; and a metal-ligand complex associated with the active material surface, the metal-ligand complex including at least one ligand datively bonded to a metal ion; and wherein the metal ion is associated with the active material surface through a dative bond.

The electrode may be an anode or a cathode.

In another aspect of the invention there is provided an electrochemical cell including: an anode, a cathode, and an electrolyte arranged between the anode and the cathode; wherein at least one of the anode or the cathode is an electrode as defined previously.

Therefore, at least one of the anode and cathode comprises an active material having a surface; and a metal-ligand complex associated with the active material surface, the metal-ligand complex including at least one ligand datively bonded to a metal ion; and wherein the metal ion is associated with the active material surface through a dative bond.

In yet another aspect of the invention, there is provided a precursor composition for fabricating an electrode, the precursor composition including: an active material having a surface; a metal-ligand complex associated with the active material surface, the metal-ligand complex including at least one ligand datively bonded to a metal ion; wherein the metal ion is associated with the active material surface through a dative bond.

In a further aspect of the invention, there is provided the use of the precursor composition described above to fabricate an electrode.

In yet a further aspect of the invention, there is provided a method for fabricating an electrode including: fabricating an electrode from the precursor composition described above.

In yet another aspect of the invention, there is provided a method for fabricating an electrode including: forming a precursor composition including an active material and fabricating an electrode from the precursor composition, wherein the method includes contacting a metal-ligand complex with a surface of the active material, the metal-ligand complex including at least one ligand datively bonded to the metal ion, and the metal ion associated with the active material surface through a dative bond.

In still a further aspect of the invention, there is provided a method of improving electrode performance including contacting a surface of an active material of an electrode with a metal-ligand complex, the metal-ligand complex including at least one ligand datively bonded to a metal ion; wherein the metal ion associates with the active material surface through a dative bond.

Further aspects of the present invention and further embodiments of the aspects described in the preceding paragraphs will become apparent from the following description, given by way of example and with reference to the accompanying drawings.

DETAILED DESCRIPTION OF THE EMBODIMENTS

Figure 1:
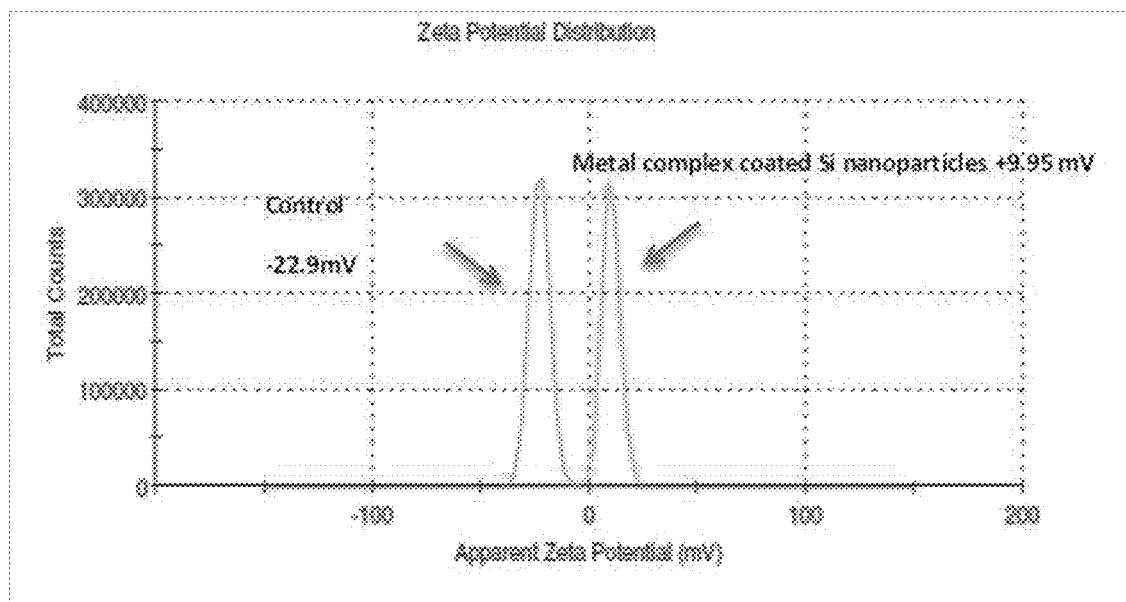
FIG. 1: Graph showing Zeta potential distribution of metal-complex coated Si and the Control. Left peak shows the Si nanoparticle before metal-ligand complex coating. The right peak shows the shift of Zeta potential from negative to positive of metal complex coated Si nanoparticle.

The present invention is, at least partly, predicated on the finding that electrodes including a metal-ligand complex within the electrode active material have a number of benefits over traditional electrodes that do not include this feature.

Without wishing to be bound by theory, the inventors believe that the use of the metal-ligand complex as an additive to an electrode's active material provides active and strong binding to the surface of the active material and thereby improves the performance of devices, such as batteries, capacitors, supercapacitors, as well as other energy storage and conversion systems that include these electrodes. Such enhancements in performance can include providing higher energy densities, faster charge and discharge cycles, stabilisation of the active material during charge and/or discharge and providing a longer cycle life.

It is thought that the metal-ligand complex acts to mitigate the strain produced on the active material particles from cyclic intercalation of an electrolyte, for example small charge carrying ions such as lithium which are typically used in electrochemical cells. That is, the metal-ligand complex acts to mitigate the stresses and strains associated with the expansion and contraction of the active material by effectively bridging the surface of the active material particles and preventing the formation of, or mitigating the effects of, any surface defects in the active material such as fissures or cracks. Additionally, the metal-ligand complex can act as a general barrier coating to maintain the structural integrity of active materials.

In one aspect of the invention there is provided an electrode including: an active material having a surface; and a metal-ligand complex associated with the active material surface, the metal-ligand complex including at least one ligand datively bonded to a metal ion; and wherein the metal ion is associated with the active material surface through a dative bond.

The term "active material", as used herein, is intended to encompass any constituent part of an electrode that is involved in the electrochemical charge and discharge reactions. The active material may also be referred to as an intercalation material or compound, which is a material or compound that can undergo both intercalation and deintercalation of an electrolyte ion to effect charge and discharge cycles.

The term "surface", as used herein in relation to the surface of an active material as defined above, is intended to encompass the surface of any particle, fibre or other shape of any material, including porous material, involved in the electrochemical charge and discharge reactions. In one embodiment, the surface of the active material will be the part of the active material presenting an electron donating group to which the metal ion can datively bond. For example, when the active material is silicon then the relevant surface may be an outer surface of each individual silicon particle.

The term "associated", as used herein in relation to the metal-ligand complex being associated with the active material surface and the metal ion being associated with the active material surface through a dative bond, is intended to encompass both the situations wherein the metal ion of the metal-ligand complex has a dative bond directly to the surface of the active material and also wherein the metal ion of the metal-ligand complex has a dative bond to at least one intermediary agent or compound which is itself interacting with the surface of the active material. For example, in the latter situation, the metal ion of the metal-ligand complex may incorporate hydrophobic ligands such as fatty acids or other hydrophobic entities such as phenyl butadiene segments. In this scenario, there can be hydrophobic interactions between relatively hydrophobic active materials with hydrophobic segments of substituted metal-ligand complexes. Alternatively, the metal ion of the metal-ligand complex has a dative bond to one or more binder materials and this binder material is associated with the surface of the active material by one or more other non-covalent interactions such as ionic, hydrophobic, van der Waal interactions and hydrogen bonding. In either scenario, a metal-ligand complex formed on the surface of one active material particle may bind other active material particle surfaces to provide the benefits described herein. In preferred embodiments the metal ion has a dative bond to the active material surface.

The present invention therefore relates to a metal-ligand complex composition that can be used as a component of an electrode, and in particular to bind to or coat an active material of the electrode. In various embodiments, the metal-ligand complex associated with the active material formed in accordance with the present invention may:
- improve adhesion or binding of the various components in the battery or other materials,
- while still being flexible enough to be wound or rolled into appropriate shapes,
- improve or increase ionic and electrical conductivity,
- improve or maintain the stability of the active material,
- decrease solubility of certain active materials, increase cycle life of batteries, capacitors, supercapacitors etc. and reducing overall material waste.

Broadly, the metal-ligand complex includes a metal ion having: one or more co-ordination sites occupied by a ligand, and one or more co-ordination sites available for binding, either directly or via an intermediary agent, to a surface of an active material of an electrode.

In an embodiment, the surface of the active material is partially coated by the layer of metal-ligand complex. However, in an alternative embodiment the surface is fully coated by the layer of the metal-ligand complex. It will be appreciated that the extent of the coating or layer formation of the metal-ligand complex around the active material particles will depend on both the amount of the metal-ligand complex added and also the number of electron-donating sites on the active material surface. In either scenario, the metal-ligand complex binds sufficiently to form a network within the active material thereby bridging between individual particles of active material and allowing the cyclic stresses during charging and discharging operations to be better accommodated.

If the metal-ligand complex does form a relatively complete layer or coating around the active material particles then, in an embodiment, the layer of the metal-ligand complex is less than about 750 nm thick, preferably less than about 500 nm, more preferably less than about 250 nm, even more preferably less than about 100 nm, still even more preferably less than about 50 nm, yet still more preferably less than about 20 or about 10 nm and most preferably less than about 5 nm. The layers which are at the lower end of this range will be those wherein the metal-ligand complex is directly bonded to the active material. However, in embodiments where the metal-ligand complex is part of a polymeric complex, as described later herein, then the layer will necessarily be much thicker but is still expected to be less than 5000 nm and preferably less than 1000 nm, and more preferably less than 500 nm. The thickness of the coating can therefore be tailored to particular applications.

As discussed previously, the electrode includes an active material at least partially coated with the metal-ligand complex. However, the electrode may include further active materials. The further active materials may be different active materials from the first active material, in which case the further active materials may or may not be coated with the metal-ligand complex. Alternatively, or in addition, the further active material may be the same material as the active material but is uncoated. Thus, in one embodiment the electrode further includes a second active material. The first active material and the second active material may be the same or different.

In a first exemplary embodiment, the first active material and the second active material are the same. In this embodiment, only the first active material is coated with the metal-ligand complex. That is, the second active material is not coated with the metal-ligand complex.

In a second exemplary embodiment, the first active material and the second active material are different. In this embodiment, both the first active material and the second active material are coated with the metal-ligand complex.

In a third exemplary embodiment, the first active material and the second active material are different. In this embodiment, the first active material is coated with the metal-ligand complex. The second active material is not coated with the metal-ligand complex.

It will be clear to the skilled addressee that these embodiments are exemplary and are not intended to be limiting. It will be understood that further active materials, such as third or fourth active materials, may also be included. While the first active material is at least partially coated, it will be appreciated that the second, third, and fourth active materials may be present as part of the electrode in any combination of coated or uncoated.

Generally, for these embodiments where there is at least a first active material and a second active material, it is preferred that the weight ratio of the first active material to the second active material is from about 10:1 to about 1:10. More preferably the ratio is from about 5:1 to about 1:5. Even more preferably, the ratio is from about 3:1 to about 1:3.

In one embodiment, the active material may be associated with the metal-ligand complex via an intermediary agent, such as, for example, a binder or a ligand designed to associate directly with the surface of the active material.

In an embodiment, the metal of the metal-ligand complex is selected from the group consisting of chromium, ruthenium, iron, cobalt, aluminium, zirconium and rhodium. Preferably, the metal is chromium.

The metal may be present in any applicable oxidation state. For example, chromium is known to have the following oxidation states of I, II, III, IV, V, or VI. In an embodiment in which the metal ion is a chromium ion, it is preferred that the chromium has an oxidation state of III.

The metal ion, when contacted with the active material, may be associated with a counter-ion (such as an anion selected from the group consisting of chloride, acetate, bromide, nitrate, perchlorate, alum, fluoride, formate, sulfide, iodide, phosphate, nitrite, iodate, chlorate, bromate, chlorite, carbonate, bicarbonate, hypochlorite, hypobromite, cyanate, oxalate, and sulphate), which can be co-ordinating or non-coordinating. In one embodiment the counter-ion is a non-coordinating anion. In another embodiment the counter-ion is a coordinating anion. The invention is not limited by the choice of counter-ion and a vast array of such counter-ions will be known to the skilled addressee and will depend, in part, on the choice of metal ion.

In certain embodiments, mixtures of different metal ions may be used, for example, to form a plurality of different metal-ligand complexes. In such cases, it is preferred that at least one metal ion is chromium.

In one embodiment, the metal forming the metal-ligand complex is not the same as that forming the active material. For example, if a chromium metal-ligand complex is employed then the active material forming the anode is not chromium metal.

In an embodiment, the wt % of metal-ligand complex in the electrode composition (as defined by the dried and fully formed electrode material cast onto the current collector) is between 0.01% to 10%. Preferably, the wt % of metal-ligand complex is between 0.1% to 5%. Most preferably, the wt % of metal-ligand complex is between 0.5% to 3%.

In preferred embodiments, the metal-ligand complex is not incorporated into the active material by a melt process. That is, the metal of the metal-ligand complex is not melted together with the active material as this would not result in formation of the required metal-ligand complex and association, as described herein, with the active material surface. It is preferred that the metal-ligand complex is incorporated into the active material in the liquid phase i.e. in the presence of a suitable solvent which forms the liquid phase.

In one particular embodiment, when the metal-ligand complex is a chromium metal-ligand complex then the active material does not include aluminium or iron as an additional material.

Metals are known to form a range of metal-ligand complexes. Preferred ligands for forming the metal-ligand complex are those that include nitrogen, oxygen, or sulfur as dative bond forming groups. More preferably, the dative bond forming groups include oxygen or nitrogen. Even more preferably, the dative bond forming group is an oxygen containing group. Still even more preferably, the oxygen containing group is selected from the group consisting of oxides, hydroxides, water, sulphates, carbonates, phosphates, or carboxylates.

In an embodiment, the ligand is a mono-, di-, or tri-atomic ligand. Preferably, the ligand is an oxygen containing species such as an oxide, a hydroxide, or water; wherein the dative bond forming group is oxygen.

Preferably the ligand is an oxo ligand.

The layer of metal-ligand complex can also be further stabilised by cross-linking the metal ions with each other to form larger oligomeric metal-ligand complexes. Thus, in one preferred embodiment the metal-ligand complex is an oligomeric metal-ligand complex.

In one embodiment, the ligand of the metal-ligand complex is a bridging moiety that is datively bonded to at least two metal ions such as oxo-, hydroxy-, carboxy-, sulpho-, and phospho-ligands. Preferably, this results in the formation of an oligomeric metal-ligand complex. In one exemplary embodiment, the metal-ligand complex is an oxo-bridged chromium (III) complex. Preferably, the metal-ligand complex is an oligomeric oxo-bridged chromium (III) complex.

The oligomeric metal-ligand complex may optionally be further polymerised with one or more bridging couplings such as carboxylic acids, sulphates, phosphates and other multi-dentate polymeric ligands to form a polymeric metal-ligand complex from clusters of oligomeric metal ligand complexes.

In an embodiment, the metal-ligand complex forms a dative bond to a further component of the electrode. Such further components may include another active material or a binder material. In some instances, for example, when the active material is in the form of a population of particles, the metal-ligand forms a dative bond with an adjacent particle in the population of particles. In another example, where there are two active materials the metal-ligand forms a further dative bond with the second active material. Alternatively, this dative bond may be formed between the metal ion and the component of the electrode.

In certain embodiments, mixtures of different ligands may be used. The different ligands may have different functions, for example, to form a plurality of different metal-ligand complexes, to bridge between metal-ligand complexes, to cross-link metal ions, to change the hydrophobicity/hydrophilicity of metal-ligand complexes or to provide a surface for forming a dative bond with a component of the electrode. Certain of these embodiments may lead to the metal-ligand complex being associated with the active material indirectly via a dative covalent bond through the ligand to another such ligand, which may be of the same or a different nature, which is bonded to the active material surface.

The skilled addressee will appreciate that the electrode may be an anode or a cathode, and may be formed from materials that are typically used for either. In either case, the active material includes a surface, and the metal ion is able to form a dative bond, either directly or indirectly, with the surface. In one embodiment, the surface of the active material includes a nitrogen, oxygen, sulfur, hydroxyl, or carboxylic acid species having a lone pair of electrons for forming a dative bond. Preferably, the surface includes an oxygen species. Oxygen species are preferred as generally, the surface of the active material can be easily oxidised to include an oxide layer or may already be considered an oxide. Thus, in a preferred embodiment the active material surface is, or is adaptable to become, an oxide surface.

In an embodiment, the active material (or the first or second active material) is selected from the group consisting of metals, intermetallic compounds, metalloids, and carbon. The electrode may be an anode, in which case the active material is typically selected from silicon, silicon containing materials (its oxides, composites and alloys), tin, a tin containing material (its oxides, composites and alloys), germanium, germanium containing material (its oxides, composites and alloys), carbon, and graphite. Preferably, when the electrode is an anode, the active material comprises silicon and/or carbon. Silicon may be in the form of pure silicon, its various oxides (SiO, $SiO_2$, etc.), its alloys (Si—Al, Si—Sn, etc.), and composites (Si—C, Si-graphene, etc.). It is preferred that the carbon is in the form of graphite, super-P carbon, graphene, carbon nanotubes, carbon nanofibers, acetylene carbon black, Ketjenblack (KB); and more preferably, graphite.

In one embodiment, when the electrode is an anode then the first active material comprises silicon.

In a further embodiment wherein the electrode is an anode then there is a first and a second active material, at least one of which comprises silicon. Preferably, in this embodiment the first active material comprises silicon and the second active material comprises carbon.

When the electrode is a cathode, the active material (or the first or second active material) is selected from sulphur, $LiFePO_4$ (LFP), mixed metal oxides which include cobalt, lithium, nickel, iron and/or manganese, and carbon. It is preferred that the carbon is in the form of one or more carbon particles selected from graphite, super-P carbon, graphene, carbon nanotubes, carbon nanofibers, acetylene carbon black, Ketjenblack (KB); and, more preferably, graphite.

It will be appreciated from the disclosure herein that the active material(s) for forming the anode and/or cathode are not particularly limited and any such material used in the prior art may be appropriate, particularly those in use for lithium ion secondary batteries and more particularly those employing a silicon-based anode.

In an embodiment, the metal-ligand complex bridges separated portions of the active material, for example adjacent particles or between regions of one particle in the case where the active material is in particulate form. Without wishing to be bound by theory, the inventors believe that bridging between separated portions of the active material in the electrode helps to attenuate the cyclic stress resulting from bulk expansion and contraction of the electrode on charging/discharging operations. Bridging between separated portions of the active material may result from direct interaction between the metal-ligand complex on separated portions of the active material, or indirectly through interaction between the metal-ligand complex with a further intermediate compound such as a binder. Thus, preferably, the electrode additionally includes a binder compound.

As discussed above, in some situations, a bridging interaction may occur between the metal-ligand complex and the binder. Thus, in certain embodiments, the metal-ligand complex includes a dative bond to a binder moiety. Preferably, the dative bond is formed between the metal ion of the metal-ligand complex and the binder moiety.

In certain embodiments, the binder is able to cross-link metal ions in the layer of metal-ligand complex to form a metal-ligand/binder complex which can bind to the active material. Preferred binder moieties include carbene, conjugated dienes, polyaromatics and heteroaromatics, a nitrogen containing group, an oxygen containing group, or a sulfur containing group. Even more preferably the binder moiety is an oxygen containing group. Most preferably, the binder moiety is at least one of a carboxyl, a hydroxyl, aldehyde and a carbonyl.

In an embodiment, the binder compound is a polymer. In embodiments where it is desirable to form a dative bond between the metal-ligand complex and the binder, preferred polymers are those including oxygen species such as acrylate, carboxyl, hydroxyl, or carbonyl moieties. These groups are able to form dative bonds with metal ions. However, other polymers without these groups may also be useful depending on the specific criteria, for example suitable polymers may be polyvinylidene fluoride (PVDF) or styrene butadiene rubber. In any event, where a dative bond is desired between the metal-ligand complex and the binder, it is even more preferable that the binder is selected from polyvinylpyrrolidone, carboxymethylcellulose, polyacrylic acid (PAA), poly(methacrylic acid), polymethylmethacrylate, polyacrylamide, polypyrrole, polyacrylonitride, maleic anhydride copolymers including poly(ethylene and maleic anhydride) and other copolymers, polyvinyl alcohol, carboxymethyl chitosan, natural polysaccharide, Xanthan gum, alginate, polyimide. Most preferably, the binder is PAA. In an alternative embodiment, where it is desirable that the binder moiety contains a nitrogen atom, a suitable polymer is polyacrylonitrile.

The binder is typically present at an amount of from about 2 to about 40 wt %, preferably of from about 5 to about 30 wt %, and most preferably of from about 5 to about 20 wt % of electrode material on the collector.

In certain embodiments, the electrode is formed from an active material that is originally provided as primary particles having a primary particle size. The active material may be combined with other constituents and then formed around a suitable current collector into an electrode. During the process of forming the electrode (whether by casting or other fabrication process) the primary particles of the active material may aggregate and form agglomerate secondary particles having a secondary particle size.

The term particle is generally intended to encompass a range of different shaped materials. The primary particle may be of any shape, such as, spheres, cylinders, rods, wires, tubes. The primary particles may be porous or non-porous.

Preferably the primary particles of the active material are nano-sized. The term "nano-sized" is intended to encompass a number average particle diameter of from about 1 nm to about 1000 nm. In this case, the primary particles of the active material are nanoshaped particulate materials such as nanoparticles, carbon nanotubes, graphene sheets, carbon based nanocomposites, nanorods, nanowires, nano arrays, nano core-shell structures and other hollow nano-structures. It is generally preferred that the primary particle is substantially spherical in shape.

Preferably, the primary particles have a number average particle diameter of at least 10 nm. More preferably, the particles have a number average particle diameter of at least 30 nm. Even more preferably, the particles have a number average particle diameter of at least 50 nm. Most preferably, the particles have a number average particle diameter of at least 70 nm.

Preferably, the primary particles have a number average particle diameter of up to 10 μm. More preferably, the particles have a number average particle diameter of up to 5 μm. Even more preferably, the particles have a number average particle diameter of up to 4 μm. It is an advantage of the present invention that the inclusion of the metal-ligand complex provides the benefits in operation when used with larger or coarse active material particles as well as with smaller particles. For example, it is standard to reduce the size of silicon particles used for anode production to the low hundreds of nm range. The examples section herein indicates that such diminution is not necessary to the working of the invention and indeed surprisingly good results can be achieved with silicon in the low micron particle diameter range.

It will be understood that the primary particles have a number average diameter that has a lower range selected from any one of about 10, 30, 50, or 70 nm; and an upper range that is selected from any one of about 10 μm, 5 μm, 4 μm or 1000, 900, 700, 500, or 300 nm. The choice may depend upon the active material and the application for the electrode.

As discussed above, after fabrication of the electrode, the primary particles of the active material may have aggregated to form agglomerate secondary particles.

In certain embodiments the metal-ligand complex is applied to the primary particles prior to any aggregation, in which case at least a portion of the surfaces of the primary particles are coated with the metal-ligand complex. Preferably, the primary particles are encapsulated by the metal-ligand complex.

In an alternative embodiment the metal-ligand complex is applied after aggregation of at least some of the primary particles. In this case, at least a portion of the surfaces of the secondary particles are coated with the metal-ligand complex. Preferably, the secondary particles are encapsulated by the metal-ligand complex. The secondary particles may be porous or non-porous.

It will also be understood that other electrode structures are contemplated other than those in which the active material is provided as a particulate. For example, the active material may have a porous morphology. In this embodiment, the surface of the porous active material is at least partially coated by the metal-ligand complex.

In still other embodiments, the surface of the active material exhibits nano-structured or nano-patterned features. The term "nano-patterned" is intended to encompass features that are in the size range of 1 to 1000 nm. In these embodiments the surface of these nano-structure or nano-patterned features are at least partially coated with the metal-ligand complex.

As discussed above, the electrode material or component to be associated with the metal-ligand complex is the active material. The active material is any part or component of the electrode that is required for electrochemical charge and discharge reactions. The electrode may be an anode, in which case the active material is typically selected from silicon, silicon containing materials (its oxides, composites and alloys), tin, a tin containing material (its oxides, composites and alloys), germanium, germanium containing material (its oxides, composites and alloys), carbon, or graphite. Alternatively, the electrode may be a cathode, in which case the active material is typically selected from a metal oxide or mixed metal oxide, carbon or graphite. In particular mixed lithium oxide materials (wherein lithium oxide is mixed with other oxides such as manganese, cobalt, nickel, etc.) is used.

The metal-ligand complex can coordinate to any electron-donating groups on the surface of the active material to bind the metal-ligand complex to the active material. Even active materials purported not to have election donating groups often have such groups as a consequence of our oxygenated atmosphere. Accordingly, the active material includes a surface having electron-donating groups, and the metal ions of the metal-ligand complex layer are bound via a dative bond to these electron-donating groups of the active material. Suitable electron-donating surface moieties include oxides.

Where there are little or no electron-donating groups on the surface of the active material, the ligand of the metal-ligand complex can also be can be a hydrophobic ligand (R—X), where X coordinates to the metal ion and so where X may be any electron-donating group that is able to form a co-ordination bond with the metal ion. The group "R" may be independently selected from alkyl, heteroalkyl, alkenyl, alkynyl, cycloalkyl, heterocycloalkyl, alkylcycloalkyl, heteroalkylcycloalkyl, aryl, heteroaryl, aralkyl and heteroaralkyl, which groups are optionally substituted. In accordance with this embodiment, "R" is preferred to have more hydrophobic character. Further, the R group may also incorporate moieties selected from a conjugated diene containing group, a polyaromatic or heteroaromatic containing group, a nitrogen containing group, an oxygen containing group, or a sulfur containing group. Preferably the "R" group is a short polymer such as shorter versions of polymeric binders such as polyvinylidene fluoride (PVDF), poly(styrene butadiene), polyethylene and its copolymers, polypropylene and its co-polymers, and polyvinyl chloride.

The metal-ligand complex layer may partially coat the active material or the coating layer may completely encapsulate the active material. In this way, the properties of the active material may be tuned. For example, a full encapsulation layer may prevent the active material from degrading or dissolving and may also serve to prevent undesired reactions (for example, where the dissolution of manganese into the electrolyte deposits excessive SEI layer growth at the anode) in other components of the battery. However, where only minimal modifications to the properties of the system/material/components are desired (for example, minimal disruption in conductivity), only a partial coating may be required.

The metal-ligand complex composition can be coated or applied onto an active material of an electrode to form a thin film on the surface of that active material. The film may be formed as a monolayer. However, thicker films can also be prepared if required. Depending on the formulations used and/or with polymeric ligands such as binders, the thickness of these coatings may be increased. This may be achieved by forming a larger complex combining the metal-ligand complex and polymeric ligands such as a binder on the surface of the active material, and/or by applying alternate coating layers, such as additional metal-ligand complexes, polymer, or binders, or nanoparticles such as aluminium oxide, titanium oxide, to form a multi-layered laminate structure on the surface of the active material. The additional coating layers may be useful in changing the overall coating properties. Thus the properties of the active material and the electrode such as its structural integrity can be tuned by controlling the thickness of the layer of the metal-ligand complex composition.

The present invention will now be described with particular reference to forming coatings on silicon anode materials. However, it will be appreciated that the underlying concepts of the invention are applicable, but not limited to any other material or components where coatings are required to maintain or enhance the pre-existing structure and/or properties of a battery material or component in the application.

Silicon anodes including the metal-ligand complex can be produced in a variety of ways. As an example, generally in the production of silicon anode slurries three key components are required: (i) silicon particles, (ii) carbon particles, and (iii) a binder such as polyacrylic acid (PAA). The metal-ligand complex can be added to the silicon particles to form an activated silicon material which may then be combined with carbon particles and PAA. Alternatively, or additionally the carbon particles may be coated with the metal-ligand complexes and then combined with the silicon particles and PAA. Alternatively, the metal-ligand complex can be combined with PAA to form a polymeric metal-ligand complex, and then combined, in any order, with silicon and carbon particles. Alternatively, the metal-ligand complex may be added directly to, and mixed with a pre-existing mixture of the silicon particles, carbon particles, and PAA.

In the case of silicon based anodes, the ability of the metal-ligand complex to form dative bonds with adjacent particles give rise to stabilised structure with an ability to form and reform those bonds within a dynamic chemical environment. Both the anode and the cathode electrodes allow lithium ions to move in and out of the interiors of the active particles that constitute those electrodes. During insertion (or intercalation) ions move into the electrode. During the reverse process, extraction (or deintercalation), ions move out of the electrode. When a lithium-ion based cell is discharging, the positive lithium ion moves from the negative electrode (in this case silicon) and enters the positive electrode (lithium containing compound). When the cell is charging, the reverse occurs.

When building a charge, silicon swells to store lithium ions. Accommodating the swelling that accompanies lithium absorption has always been a challenge when designing high-capacity lithium-ion anode materials. Silicon has amongst the highest capacity among lithium-ion storage materials, but it swells to 3-4 times its volume when fully charged. This swelling quickly breaks the electrical contacts in the anode. Metal-ligand complexes as described in the invention form coordination forces between the various components of the silicon anode material. Without wishing to be bound by theory, the inventors believe that this combined binding can resist expansion and contraction within the active material. Further, even if there is breakage of some of these coordination bonds during expansion, the coordination bonds can reform after contraction. Consequently, the present invention provides for an electrode of higher stability and longer life. Further, the metal-ligand complex does not act as an insulator and permits electrons to move freely.

The benefits of metal-ligand complex coatings are not restricted to anodes. The benefits described above also allow more effective performance of cathodes. New cathode materials based on mixed lithium oxides containing mixtures of cobalt, lithium and nickel have stability problems. These relate mainly to dissolution of manganese and/or nickel from the solid into the electrolyte, which deposits on to the anode material and, as discussed above, causes excessive SEI layer growth in the anode. Thin deposits of aluminium oxides on cathode materials have been shown to increase stability but there is no current cost-effective process for achieving such coatings. The metal-ligand complexes of the invention can be applied to the active material to act as a diffusion barrier and chemically lock-in the manganese oxide near to the surface. Additionally, stronger interactions between different components of the electrodes allow improved efficiency of electron transfer leading to longer battery life.

The present invention is not restricted to batteries but is equally applicable to capacitors and supercapacitors and other energy storage and conversion systems. In effect, any arrangement employing an electrode may benefit from the inclusion of the metal-ligand complexes as described herein. The same characteristic of enhanced performance as a result of the underlying concepts of metal-ligand complexes also applies.

The metal-ligand complex will be discussed below.

The inventors have found that, generally, the metal-ligand complexes can be formed by providing conditions for forming electron donating groups for bridging or otherwise linking or bonding two or more metal ions. One method can be olation of chromium (III) ions by providing a pH below pH 7, preferably about 1.5 to 6, preferably about 2 to 5 to the composition formed from the contact of the metal-ligand complexes with the surface of the active material.

Various chromium salts such as chromium chloride, chromium nitrate, chromium sulphate, chromium perchlorates, may be used to form the metal-ligand complex. These salts are mixed with an alkaline solution, such as potassium hydroxide, sodium bicarbonate, sodium sulphite and ammonia to form different metal-ligand complexes. Organic reagents that can act as bases such as ethylene diamine, bis(3-aminopropyl)diethylamine, pyridine, imidazoles, can also be used. The size and structure of the metal-ligand complex can be controlled with variations in pH, temperature, solvents and other conditions.

In particular, by changing the metal salts and reaction environment, it is possible to modulate the binding of the metal-ligand complex to oxides (such as in silica) and other solid substrates, and to present a coordination layer to bind other constituents, such as nanoparticles to the surface of the substrate, i.e. additional active material particles or particles of a second or further active material of an electrode. While individual coordination interactions either between the metal-ligand complex and a given active material are relatively weak, the multiplicity of coordination forces leads to a very strong interaction. Individually, each coordination interaction is likely to break as a result of a local stressor at some point. However, it is unlikely that this local stressor will break all of the plural coordination bonds. Therefore, on relaxation, the broken bond, for example to the active material surface, can reform thereby mitigating the stress through future cycles.

The metal-ligand complex can be further stabilised by cross-linking the metal ions with each other to form larger oligomeric metal-ligand complexes. Therefore, in one embodiment, the metal-ligand complex is an oligomeric metal-ligand complex. Such oligomeric metal-ligand complexes can be pre-formed and applied to the active material, or formed in-situ on the surface of the active material. In this case, the ligands are able to form multiple dative bonds with multiple metal ions, to effectively bridge or cross-link the metal ions. That is, the ligand may form dative bonds with two or more metal ions, thereby linking one metal ion to another metal ion.

Exemplary oxo-bridged chromium structures are provided below:

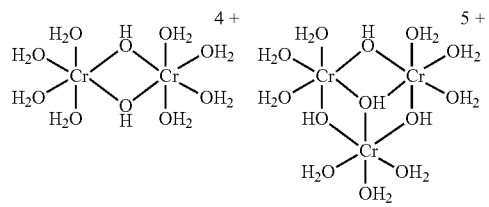

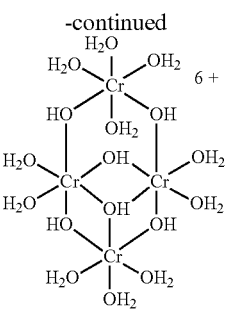

On application to an active material, at least one of the water or hydroxyl groups on each of the metal-ligand complexes is replaced by a dative bond with the surface of the active material, for example a silica/silicon particle. This is illustrated below wherein "X" represents the dative bond to the surface of the active material.

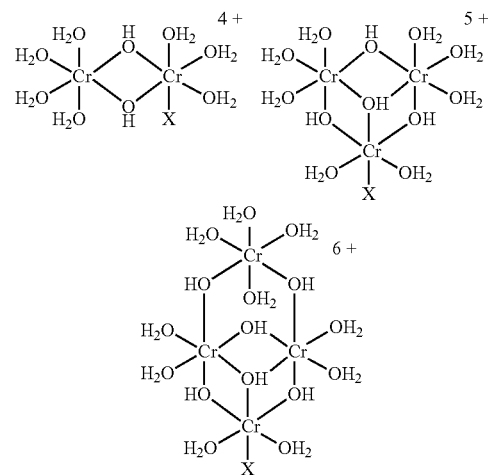

It will also be appreciated that multiple water or hydroxyl groups may be replaced by dative bonds with the surface of the active material, for example each chromium ion may form a dative bond with the surface of the active material.

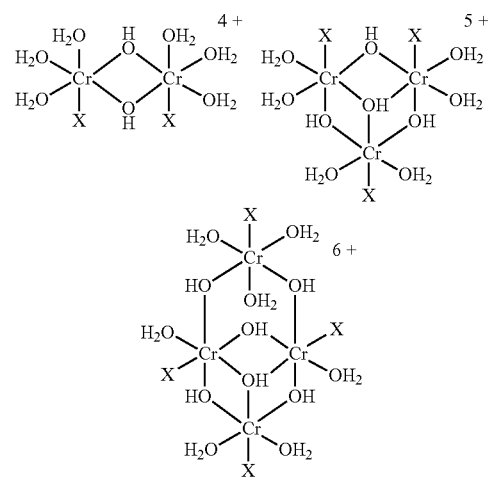

In addition, the water and/or hydroxyl groups may be replaced by a dative bond with another component of the electrode, such as a further active material or binder.

Multiple oligomeric metal-ligand complexes can be further cross-linked with each other using larger multi-dentate ligands, such as a binder, to form even larger oligomeric metal-ligand complexes. Therefore, in another embodiment, the metal-ligand complex is a polymeric metal-ligand complex. Such polymeric metal-ligand complexes can be pre-formed and applied to the active material, or formed in-situ on the surface of the active material. In this case, the multi-dentate ligands are able to form multiple dative bonds in multiple metal-ligand complexes, to effectively bridge or cross-link the metal ions across larger distances or between first and second active materials.

The metal-ligand complexes, oligomeric metal-ligand complexes and polymeric metal-ligand complexes can be further masked by ligands of varying hydrophobicities to change the overall hydrophilicity/hydrophobicity of these complexes. Therefore, in another embodiment, the metal-ligand complex, oligomeric metal-ligand complexes and polymeric metal-ligand complexes can be masked versions of such metal-ligand complexes. Such masked metal-ligand complexes can be pre-formed and applied to the active material, or formed in-situ to change the surface properties of the active material. In this case, the masking ligands are able to change the surface properties of the first active material to bind more effectively with second active material.

In another aspect of the invention there is provided an electrochemical cell including: an anode, a cathode, and an electrolyte arranged between the anode and the cathode; wherein at least one of the anode or the cathode is an electrode as defined previously.

Therefore, at least one of the anode and cathode comprises an active material having a surface; and a metal-ligand complex associated with the active material surface, the metal-ligand complex including at least one ligand datively bonded to a metal ion; and wherein the metal ion is associated with the active material surface through a dative bond.

In yet another aspect of the invention, there is provided a precursor composition for fabricating an electrode, the precursor composition including: an active material having a surface; a metal-ligand complex associated with the active material surface, the metal-ligand complex including at least one ligand datively bonded to a metal ion; wherein the metal ion is associated with the active material surface through a dative bond. The various features of the precursor composition are as described as previously in relation to the electrode.

The precursor composition may further comprise a binder compound, as previously described.

In an embodiment, the active material is provided in the form of particles having a primary particle size as defined previously.

In a further aspect of the invention, there is provided the use of the precursor composition described above to fabricate an electrode.

In yet a further aspect of the invention, there is provided a method for fabricating an electrode including: fabricating an electrode from the precursor composition described above.

In yet another aspect of the invention, there is provided a method for fabricating an electrode including: forming a precursor composition including an active material and fabricating an electrode from the precursor composition, wherein the method includes contacting a metal-ligand complex with a surface of the active material, the metal-ligand complex including at least one ligand datively bonded to the metal ion, and the metal ion associated with the active material surface through a dative bond.

The methods of fabricating an electrode may further include the step of casting the precursor composition onto a current collector to form the electrode.

It will be understood that the metal-ligand complex may be applied to the surface of the active material at any stage during the process. For example, in a first illustrative embodiment, the active material is coated with the metal-ligand complex prior to the step of forming the precursor composition. In a second illustrative embodiment, the metal-ligand complex is mixed into the precursor composition. In a third illustrative embodiment, the metal-ligand complex is added during the step of fabricating the electrode. In a fourth illustrative embodiment, the metal-ligand complex is added to the binder to form a metal-binder complex prior to the step of fabricating the electrode. In a fifth illustrative embodiment, the metal-ligand complex is coated onto the active material after formation of the electrode.

In an embodiment, the step of fabricating the electrode includes casting the electrode from the precursor composition.

In still a further aspect of the invention, there is provided a method of improving electrode performance including coating a surface of an active material of an electrode with a layer of a metal-ligand complex, the metal-ligand complex including at least one ligand datively bonded to a metal ion; wherein the metal ion forms a dative bond with the surface of the active material.

As a result of coating the surface of the active material of the electrode, the electrode exhibits improved performance as compared with an uncoated electrode. In certain embodiments, the improved performance is at least one selected from the group consisting of: higher $1^{st}$ cycle discharge capacity, higher $1^{st}$ cycle efficiency, higher capacity after 500 deep charge/discharge cycles at 100% depth of charge. Preferably, the improved performance is higher capacity after 500 deep charge/discharge cycles.

In one embodiment, the capacity after 500 deep charge/discharge cycles at 100% depth of charge is at least 5% greater than an uncoated electrode; even more preferably at least 7%; most preferably at least 9%.

In another embodiment, the capacity after 500 deep charge/discharge cycles at 100% depth of charge is at least 30% greater than an uncoated electrode; even more preferably at least 50%; most preferably at least 70%.

It will be understood that the invention disclosed and defined in this specification extends to all alternative combinations of two or more of the individual features mentioned or evident from the text or drawings. All of these different combinations constitute various alternative aspects of the invention.

EXAMPLES

Example 1: Preparation of Metal-Ligand Complex Solutions

Three different solutions of metal-ligand complexes are described. Depending on the salt, the base, final pH, and other ligands used, the metal-ligand complex solutions exhibit different binding properties which can be tailored to the active material being coated.

Solution 1

In this example, chromium perchlorate hexahydrate (45.9 g) was dissolved into 480 mL of purified water and mixed thoroughly until all solid dissolved. Similarly, 8 mls of ethylene diamine solution was added to 490 mL of purified water. The solutions were combined and stirred overnight at room temperature, and then left to equilibrate to a pH of approximately 4.5.

Solution 2

In this example, chromium chloride hexahydrate (26.6 gm) was dissolved into 500 mL of purified water and mixed thoroughly until all solid dissolved. The pH was adjusted slowly to 4.5 with 1M NaOH or LiOH.

Solution 3

In this example, chromium chloride hexahydrate (45.9 g) was dissolved into 480 mL of purified water and mixed thoroughly until all solid dissolved. Similarly, 8 mL of ethylene diamine solution was added to 490 mL of purified water. The solutions were combined and stirred overnight at room temperature, and then left to equilibrate to a pH of approximately 3.8.

Example 2: Preparation of Metal-Ligand Complex Coated Silicon Nanoparticles

A. Formation of Metal-Ligand Complex Silicon Slurries

In this example, a 50 mM (final concentration) metal complex (Solution 1) was used. Silicon (Si) nanopowder (100 nm in size) was purchased from MTI Corporation in the US. A 20% w/v silicon nanoparticle slurry was prepared by mixing the dry silicon nanopowder with a pH 4.3 7.5% isopropanol in ddH$_2$O in a round bottom flask. The slurry was placed under vacuum for 5 minutes before 100 mM metal-ligand complex solution was added. The flask was heated to 40° C. and the slurry was mixed at 400 rpm for 5 minutes by a mechanical overhead mixer with an axial flow impeller. The impeller was removed and the solution was vacuumed for another 10 minutes. The impeller was replaced and the slurry was allowed to mix overnight at 40° C. at 400 rpm. The overnight slurry was transferred into centrifuge tubes and centrifuged at 10,000 g for 10 minutes to separate the solids from the solution. 70% of supernatant was removed from the starting volume and was replaced with ddH$_2$O at pH 4.3. The pellet was resuspended using physical agitation and bath sonication on high for 10 minutes. This wash step was repeated and following a third centrifugation step the supernatant was removed from the solution. ddH$_2$O at pH 4.3 was added to the slurry until a 20% w/v solid content was reached. The slurry was bath sonicated for another 10 minutes to fully disperse the particles. Various concentrations (50, 25 and 10 mM) of metal-ligand complex combined with various number of wash steps were used to coat the Si nanoparticles.

B. Zeta Potential, SEM and ICP-AES Analysis of Metal-Ligand Complex-Coated Silicon Nanoparticles Zeta potential analysis was conducted using Malvern Zeta Potential analyser for metal-ligand complex coated Si nanoparticles and the control (Si nanoparticles in water). The Zeta potential distribution curves are shown in FIG. 1, which indicate that the Zeta potential of metal-ligand complex coated Si was shifted to more positive value as compared to the control (negative charge). This supports the formation of a positively charged metal-complex coating on the surface of the Si nanoparticles and, depending on the conditions used, the overall shift in Zeta potential can vary. The scanning electron microscopy (SEM) study also shows that the coating is too thin for an SEM instrument to resolve (resolution <10 nm). Inductively coupled plasma atomic emission spectroscopy (ICP-AES) analysis of the metal complex-activated silicon nanoparticles was performed by Spectrometer Services Pty Ltd (Victoria, Australia). Based on the apparent density of the starting materials the metal-ligand complex layer was estimated at being <5 nm in thickness based on an estimated 1% uptake of the original metal-ligand complex solution.

Example 3: Fabrication and Testing of Si Anode with & without Metal-Ligand Complex in Coin Cells Using Metal-Ligand Complex-Coated Silicon Nanoparticles A. Preparation of Battery Slurries Metal-ligand complex-coated silicon nanoparticles were prepared as outlined in Example 2. TIMCAL Graphite & Super P Conductive Carbon Black was purchased from MTI Corporation in the US and Poly(acrylic acid) (PAA) average M$_w$ 450,000 Dalton was purchased from Sigma-Aldrich. The metal-ligand complex-coated silicon nanoparticles were transferred into a side arm flask with magnetic stirrer bar. A mass of Super P Carbon equal to the dry weight of metal-ligand complex-coated silicon nanoparticles was weighed and transferred into the same flask. The slurry was diluted to 15% w/v solid content by adding 15% isopropanol in ddH$_2$O. The slurry flask was placed on a heated stirrer and mixed at 40° C. at 400 rpm for 5 minutes. The flask was placed under vacuum and mixing continued for another 5 minutes. The vacuum apparatus was removed and the slurry was left to mix for another hour. 450 kDa poly(acrylic acid) equivalent to half the mass of Super P Carbon was weighed out and added to the slurry. The slurry was allowed to mix overnight at 40° C. at 400 rpm. This gave a slurry with a ratio of Si:Super-P:PAA at 40:40:20 (wt %). The amounts of Si, Super-P and PAA were adjusted to give different formulations of slurries.

B. Fabrication and Testing of Metal-Ligand Complex Coated Si Anode in the Coin Cell Battery The Si particles were coated using 50 mM metal-ligand complex concentration with 2 washes to remove un-reacted metal-ligand complex solutions. The slurry mixing procedure was the same as described in previous examples and the ratio of Si:Super-P:PAA was set at 40:40:20 (wt %). The Si slurries were sent for electrode fabrication and coin cell assembly. The Si slurries were casted onto copper (Cu) foil which was used as the current collector to form the Si electrode. The Si electrode was then dried under vacuum, calendered and cut for coin cell assembly. The Si electrode with uncoated Si as the active material was fabricated and used as a Control, which had similar mass loadings (2.22-2.37 mg/cm$^2$) as the metal-ligand complex coated Si electrode. Lithium (Li) metal was used as the counter electrode, and 1M LiPF$_6$/EC:DEC:DMC=1:1:1 with 10% FEC was used as electrolyte for the coin cell assembly. For charge/discharge cycling tests, the coin cells were activated at 0.01 C (1 C=4,200 mAh/g) for 2 cycles and then cycled at 0.5 C (1 C=4,200 mAh/g) for long-term stability testing. The C rates were based on the mass of Si particles in the electrodes. The voltage range for charge/discharge tests was 0.005-1.50 V vs. Li. The charge/discharge tests were conducted on Neware multi-channel battery testers controlled by a computer. Three replicate cells were made and tested for each condition.

Figure 2:
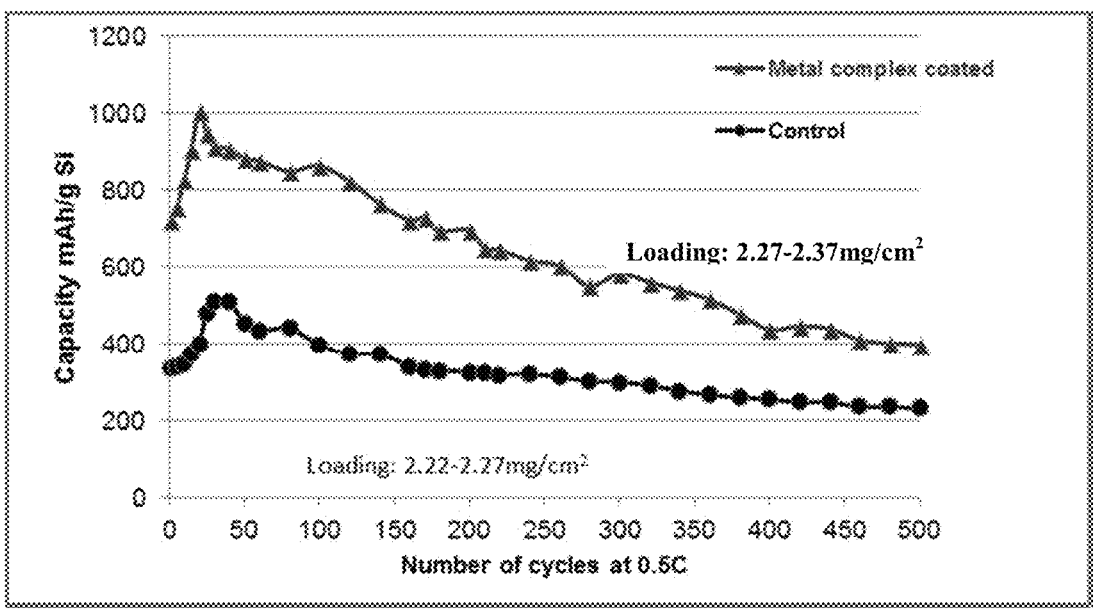
FIG. 2: Graph showing charge/discharge cycling stability of metal-ligand complex coated Si and the Control with similar mass loadings.

Table 1 summarises the data of the charge/discharge cycling tests for metal-ligand complex coated Si and the Control, and FIG. 2 shows the comparison of the long-term cycling stability for metal-ligand complex coated Si and the control. The data shows that metal-ligand complex coated Si had higher discharge capacities, higher charge/discharge efficiencies and better high-rate capacity retention. The cycling stability tests show that metal-ligand complex coated Si had superior long-term stability and the capacity of the metal-ligand complex coated Si was still significantly higher than that of the control after 500 deep cycles (100% DOD—depth of discharge) at 0.5 C (1 C=4,200 mAh/g).

TABLE 1

Charge/discharge cycling data for chromium metal-complex coated Si
and the control with similar mass loadings

| Comparison | 1st cycle discharge capacity (mAh/g Si) at 0.01 C | 1st cycle efficiency (100%) at 0.01 C | $2^{nd}$ cycle discharge capacity (mAh/g Si) at 0.01 C | $2^{nd}$ cycle efficiency (100%) at 0.01 C | $1^{st}$ cycle discharge capacity (mAh/g Si) at 0.5 C | Capacity retention (100%, ratio of capacity at 1st cycle/0.5 C to capacity at 2nd cycle/0.01 C) | Capacity (mAh/g Si) at the 500th cycle at 0.5 C |
|---|---|---|---|---|---|---|---|
| Si with metal-ligand complex* | 1214 | 48 | 1159 | 83 | 723 | 63 | 397 |
| Control* | 625 | 38 | 823 | 51 | 335 | 41 | 231 |

*Data was based on the average of 3 replicate cells, and metal-ligand complex coated Si and the control had similar mass loadings (2.22-2.37 mg/cm²).

Example 4: Fabrication and Testing of a Si Anode with Metal-Ligand Complex and Ball Milling This example aims to optimise the processing for mixing the Si slurries and to look at the effect of ball milling on the charge/discharge cycling performance of Si anode with metal-ligand complex.

The Si particles were coated using 50 mM chromium metal-ligand complex with 2 washes, as above. The slurry mixing procedure was the same as described in previous examples and the ratio of Si:Super-P:PAA was set at 40:40:20 (wt %). Ball milling was used to process the Si slurries with & without metal-ligand complex. The procedures for fabricating the Si electrodes and assembling the coin cells were the same as described in previous examples. For charge/discharge cycling tests, the coin cells were activated at 0.03 C (1 C=4200 mAh/g) for 2 cycles and then cycled at 0.5 C (1 C=4,200 mAh/g) for long-term stability testing. The voltage range for charge/discharge tests was 0.005-1.50 V vs. Li.

Figure 3:
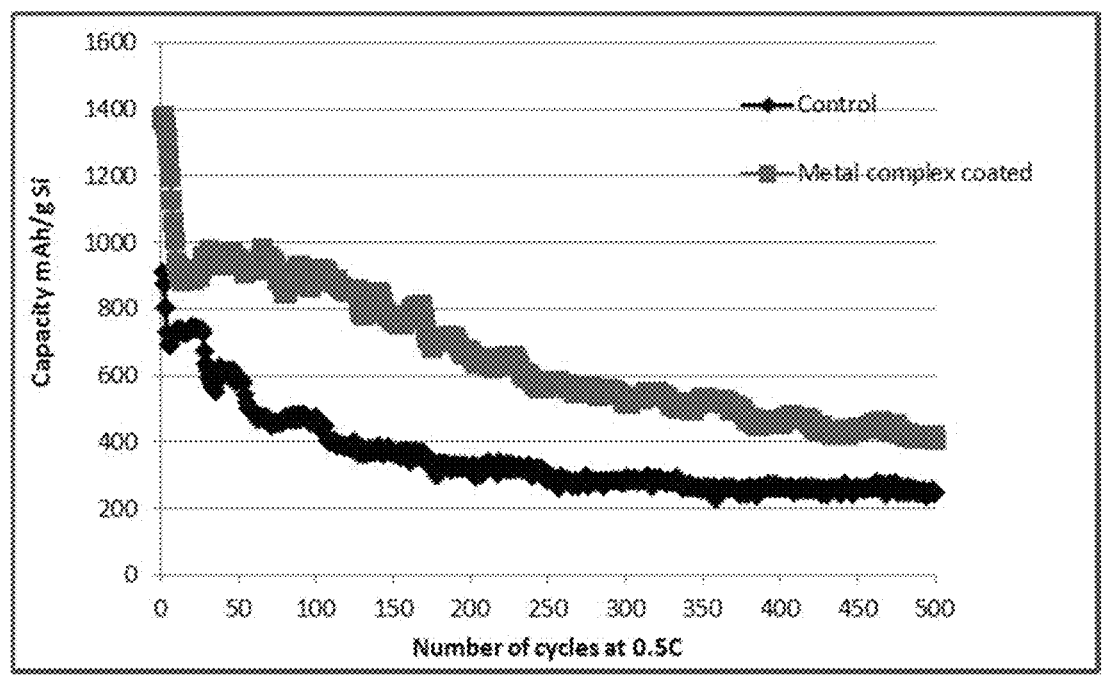
FIG. 3: Graph showing charge/discharge cycling data of metal-ligand complex coated Si and the Control using ball milling mixing.

Table 2 summarises the data of the charge/discharge cycling tests for metal-complex coated Si and the control, and FIG. 3 shows the comparison of the long-term cycling stability for metal-ligand complex coated Si and the Control. The data shows that the performance of the Si anode was significantly enhanced by using ball milling and the metal-ligand complex coated Si (with 27% higher mass loading) performed better than the Control in terms of discharge capacity, charge/discharge efficiency and high-rate capacity retention. After 500 deep charge/discharge cycles (100% DOD) at 0.5 C, the capacity of the metal-ligand complex coated Si was still significantly higher than that of the Control.

TABLE 2

Charge/discharge cycling data for metal-complex coated Si and the
Control with ball milling

| Comparison | 1st cycle discharge capacity (mAh/g Si) at 0.03 C | 1st cycle efficiency (100%) at 0.03 C | $2^{nd}$ cycle discharge capacity (mAh/g Si) at 0.03 C | $2^{nd}$ cycle efficiency (100%) at 0.03 C | $1^{st}$ cycle discharge capacity (mAh/g Si) at 0.5 C | Capacity retention (100%, ratio of capacity at 1st cycle/0.5 C to capacity at 2nd cycle/0.03 C) | Capacity (mAh/g Si) at the 500th cycle at 0.5 C |
|---|---|---|---|---|---|---|---|
| Si with metal-ligand complex*# | 2287 | 66 | 2226 | 93 | 1372 | 62 | 406 |
| Control# | 1281 | 57 | 1600 | 91 | 912 | 57 | 250 |

*Data was based on the average of 3 replicate cells, and the mass loading of metal-ligand complex coated Si was 27% higher than that of the control.
Ball milling was used to process the slurries.

Example 5: Using Silicon Particles with Larger Particle Size (1-3 Um) to Compare the Performance of Micron and Nano-Size Particles This example compares the charge/discharge cycling performance of larger micron-size silicon particles with and without metal-ligand complex.

Figure 4:
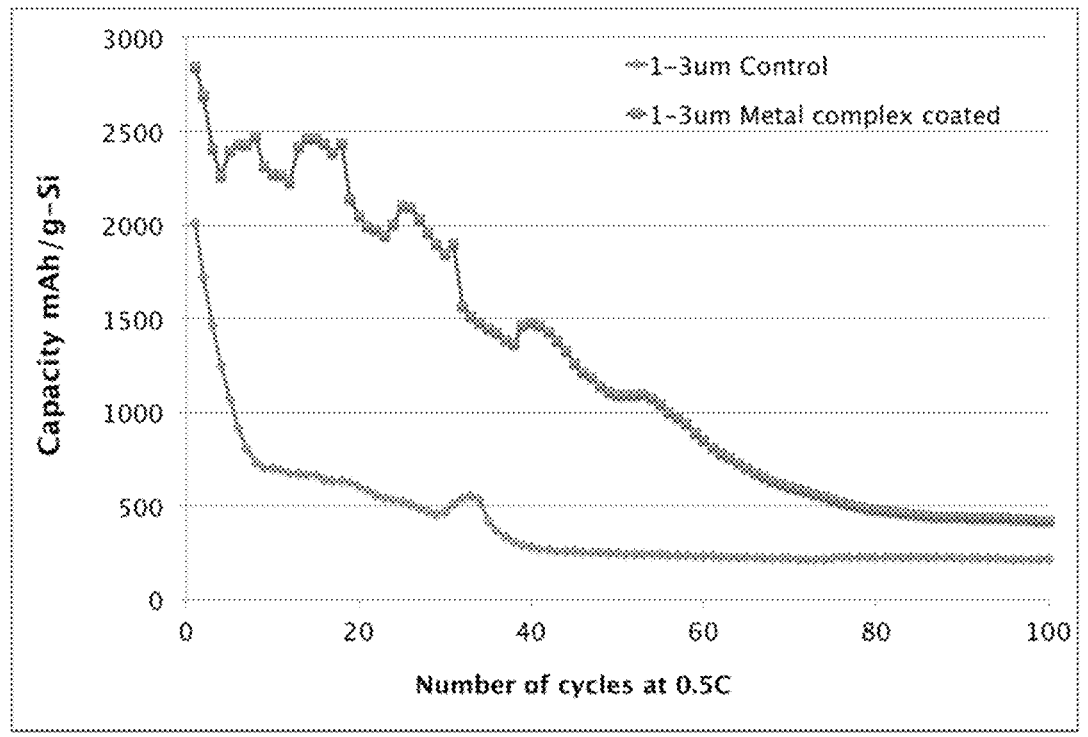
FIG. 4: Graph showing charge/discharge cycling stability of metal-ligand complex coated micro-size Si (1-3 um) and Control (1-3 um).

The procedures for making slurries, fabricating coin cells and testing coin cells were the same as discussed for Examples 3 and 4. Micron sized silicon particles with a particle size of 1-3 um were sourced from US Research Nanomaterials and were coated using 25 mM metal-ligand complex with 1 wash. Table 3 summarises the data of the charge/discharge cycling tests for metal-ligand complex coated Si (1-3 um) and the Control (1-3 um), and FIG. 4 shows the comparison of the long-term cycling stability for metal-ligand complex coated Si (1-3 um) and the Control (1-3 um). The data shows that metal-ligand complex coated Si had higher discharge capacities, higher charge/discharge efficiencies and better high-rate capacity retention than the control. The cycling stability tests show that metal-ligand complex coated Si had good stability and the capacity of the metal-ligand complex coated Si was still significantly higher than that of the control after 100 deep charge/discharge cycles (100% DOD—depth of discharge) at 0.5 C (1 C=4, 200 mAh/g).

Compared to the 100 nm Si nanoparticles used in Example 4, micro-size (1-3 um) Si particles had much higher initial discharge capacity and charge/discharge efficiency. The micro-size Si particles also have the benefits of lower cost, easier handling and less safety concern as compared to nano-size particles. Therefore micro-size Si particles are preferred from a viewpoint of practical applications in the battery industry. The big challenge with using large micro-size Si particles is the exacerbation of the swelling and stability issue. The present data has shown that the cycling stability of micro-size Si particles can be significantly enhanced by using metal-ligand complex coatings.

TABLE 3

Charge/discharge cycling data for micro size (1-3 um) Si with and without metal-ligand complex

| Comparison | Si with metal-ligand complex* | Control* |
|---|---|---|
| $1^{st}$ cycle capacity at 0.03 C (mAh/g Si) | 3639 | 3244 |
| $1^{st}$ cycle efficiency at 0.03 C (%) | 87 | 82 |
| $2^{nd}$ cycle capacity at 0.03 C (mAh/g Si) | 3567 | 3202 |
| $2^{nd}$ cycle efficiency at 0.03 C(%) | 97 | 88 |
| $1^{st}$ cycle capacity at 0.5 C (mAh/g Si) | 2565 | 1866 |
| $1^{st}$ cycle efficiency at 0.5 C (%) | 94 | 82 |
| Capacity retention at 0.5 C/0.03 C (%) | 70 | 59 |
| Capacity (mAh/g Si) at the $100^{th}$ cycle at 0.5 C | 419 | 216 |

*Data was based on the average of 4 replicate cells.

Example 6: Fabrication and Testing of a Si Anode with Metal-Ligand Complex and a Slurry Formulation of Si:Super-P:PAA=70:20:10

This example investigates the effect of variation in slurry formulation on the charge/discharge cycling performance of the Si anode with metal-ligand complex.

The Si particles were coated using 50 mM metal-ligand complex with 2 washes, as above. The slurry mixing procedure was the same as described in Example 4 but the ratio of Si:Super-P:PAA was adjusted to 70:20:10 (wt %). The procedures for fabricating the Si electrodes and assembling the coin cells were the same as described in previous examples. For charge/discharge cycling tests, the coin cells were activated at 0.03 C (1 C=4200 mAh/g) for 2 cycles and then cycled at 0.5 C (1 C=4,200 mAh/g) for long-term stability testing. The voltage range for charge/discharge tests was 0.005-1.50 V vs. Li.

Figure 5:
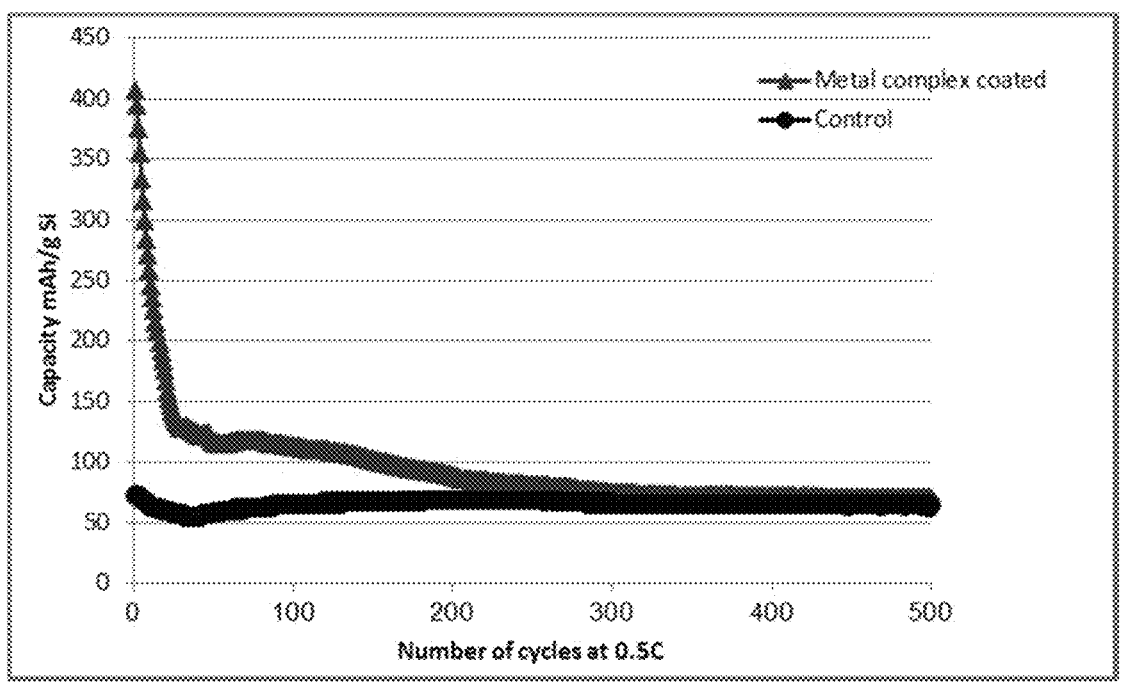
FIG. 5: Graph showing charge/discharge cycling data of metal-ligand complex coated Si and Control with different slurry formulation of Si:Super-P:PAA=70:20:10 (wt %).

Table 4 summarises the data of the charge/discharge cycling tests for metal-ligand complex coated Si and the control, and FIG. 5 shows the comparison of the long-term cycling stability for metal-ligand complex coated Si and the control. The data shows that metal-ligand complex coated Si had much higher initial capacities at both 0.03 C and 0.5 C than the Control, and the capacity was similar after over 200 deep cycles (100% DOD) at 0.5 C for metal-ligand complex coated Si and the Control. This indicates that the slurry formulation plays an important role in optimising the performance of the Si anode with metal-ligand complex and allows for a level of control over performance.

TABLE 4

Charge/discharge cycling data for metal-complex coated Si and the control with a slurry formulation of Si:Super-P:PAA = 70:20:10

| Comparison | $1^{st}$ cycle discharge capacity (mAh/g Si) at 0.03 C | $1^{st}$ cycle efficiency (100%) at 0.03 C | $2^{nd}$ cycle discharge capacity (mAh/g Si) at 0.03 C | $2^{nd}$ cycle efficiency (100%) at 0.03 C | $1^{st}$ cycle discharge capacity (mAh/g Si) at 0.5 C | Capacity retention (100%, ratio of capacity at 1st cycle/0.5 C to capacity at 2nd cycle/0.03 C) | Capacity (mAh/g Si) at the 500th cycle at 0.5 C |
|---|---|---|---|---|---|---|---|
| Si with metal-ligand complex* | 1119 | 61 | 1029 | 86 | 407 | 40 | 71 |
| Control* | 287 | 45 | 301 | 82 | 72 | 24 | 65 |

*Data was based on the average of 3 replicate cells, and metal-ligand complex coated Si and the control had similar mass loadings.

Example 7: Fabrication and Testing of a Si Anode Coated with Different Concentrations of Metal-Ligand Complex This example looks at the effect of metal-ligand complex concentrations and the need for wash steps on the charge/discharge cycling performance of Si anode The Si particles were coated with various concentrations of metal-ligand complex, which were 50 mM, 25 mM and 10 mM respectively. The effect of wash step after the coating step was also investigated. For the 50 mM metal-ligand complex experiment, 2 washes were conducted after the coating step to remove the excess metal-ligand complex. For the 25 mM metal-complex experiment, 1 wash and no wash were conducted respectively. For the 10 mM metal-ligand complex experiment, no wash was conducted. The slurry mixing procedure was the same as described in previous examples and the ratio of Si:Super-P:PAA was set at 40:40:20 (wt %). The slurries were sent for ball-milling processing, electrode fabrication and coin cell assembly. The procedures for fabricating the Si electrodes and assembling the coin cells were the same as described in previous examples. For charge/discharge cycling tests, the coin cells were activated at 0.03 C (1 C=4200 mAh/g) for 2 cycles and then cycled at 0.5 C (1 C=4,200 mAh/g) for long-term stability testing. The voltage range for charge/discharge tests was 0.005-1.50 V vs. Li.

Figure 6:
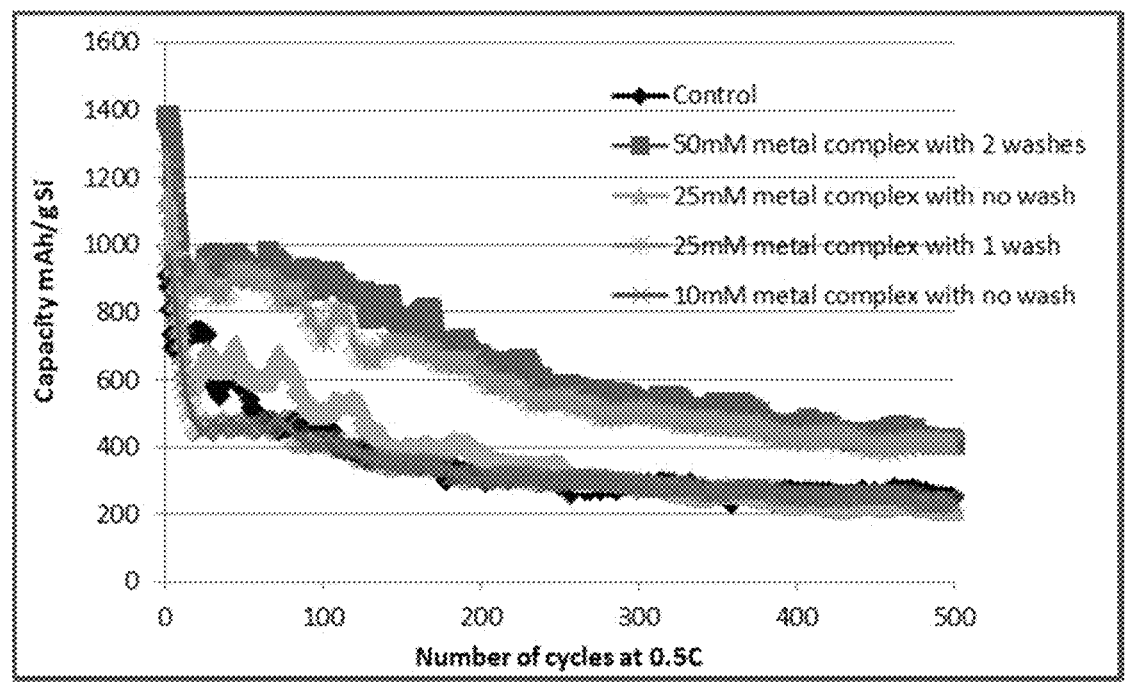
FIG. 6: Graph showing charge/discharge cycling stability of various concentrations (10, 25 and 50 mM) of metal-complex coatings on Si and the Control with and without washing.

Table 5 summarises the data of the charge/discharge cycling tests for the metal-ligand complex coated Si and the Control, and FIG. 6 shows the comparison of the long-term cycling stability for metal-ligand complex coated Si and the Control. The data shows that metal-ligand complex coated Si (with 20-27% higher mass loading) had higher discharge capacities, better charge/discharge efficiencies, better high-rate capacity retention and better long-term cycling stability than the control. With a decrease in metal-complex concentration, the beneficial effect of the metal-ligand complex coating tended to decrease, which was an indication that the metal-ligand complex coating was effective to improve the charge/discharge performance of the Si anode. The data also shows that both metal-ligand complex concentration and wash step had significant effect on the performance of Si anode. The Si anode coated with 25 mM metal-complex with 1 wash showed similar long-term cycling stability at 0.5 C as the one coated with 50 mM metal-ligand complex with 2 washes, but the 0.03 C discharge capacity of 25 mM/1 wash was significantly lower than that of 50 mM/2 washes. The data suggest that optimum coating conditions (concentration, pH and temperature etc.) for the slurry formulations used can maximise the performance of the Si anode as well as eliminate the need for wash steps.

TABLE 5

Charge/discharge cycling data for Si coated with different concentrations (10, 25 and 50 mM) of metal-ligand complex and the control

| Comparison | 1st cycle discharge capacity (mAh/g Si) at 0.03 C | 1st cycle efficiency (100%) at 0.03 C | 2nd cycle discharge capacity (mAh/g Si) at 0.03 C | 2nd cycle efficiency (100%) at 0.03 C | 1st cycle discharge capacity (mAh/g Si) at 0.5 C | Capacity retention (100%, ratio of capacity at 1st cycle/0.5 C to capacity at 2nd cycle/0.03 C) | Capacity (mAh/g Si) at the 500th cycle at 0.5 C |
|---|---|---|---|---|---|---|---|
| Si with metal-ligand complex - 50 mM/2 washes* | 2287 | 66 | 2226 | 93 | 1372 | 62 | 406 |
| Si with metal-ligand complex - 25 mM/1 wash* | 1834 | 63 | 1771 | 90 | 1258 | 71 | 407 |
| Si with metal-ligand complex - 25 mM/no wash* | 2111 | 59 | 1915 | 87 | 1144 | 60 | 216 |
| Si with metal-ligand complex - 10 mM/no wash* | 1991 | 58 | 1771 | 85 | 971 | 55 | 238 |
| Control | 1281 | 57 | 1600 | 91 | 912 | 57 | 250 |

*Data was based on the average of 3 replicate cells, and the mass loading of metal-ligand complex coated Si was 20-27% higher than that of the control.

Example 8: Fabrication and Testing of a Si Anode in Coin Cells Activated with Different Charge/Discharge Rates This example investigates fast activation or fast charge/discharge capabilities of a Si anode with metal-ligand complex.

The Si particles were coated using 50 mM metal-ligand complex with 2 washes as described in Example 2. The slurry mixing procedure was the same as described in Example 3 and the ratio of Si:Super-P:PAA was set at 40:40:20 (wt %). The procedures for fabricating the Si electrodes and assembling the coin cells were the same as described in previous examples. For charging/discharging tests, the coin cells were charged/discharged at 0.01 C and 0.03 C (1 C=4200 mAh/g) respectively. The voltage range for charge/discharge tests was 0.005-1.50 V vs. Li. The capacities and charge/discharge efficiencies of metal-ligand complex coated Si and the control were obtained at two different rates (0.01 C and 0.03 C) for comparison.

Table 6 summarises the data of the charge/discharge tests for metal-ligand complex coated Si and the Control at two different rates (0.01 C and 0.03 C). The data shows that metal-ligand complex coated Si (with 20-27% higher mass loading) had higher discharge capacities and better charge/discharge efficiencies at both 0.01 C and 0.03 C than the Control. When the charge/discharge rate was increased from 0.01 C to 0.03 C, the capacity retention of metal-ligand complex coated Si was 88% which was significantly higher than 58% of the Control. This indicates that metal-ligand complex coating enables faster activation or faster charge/discharge for Si anode.

TABLE 6

Charge/discharge cycling data for metal-ligand complex coated Si and the control tested at two different charge/discharge rates (0.01 C and 0.03 C)

| Comparison | $1^{st}$ cycle discharge capacity (mAh/g Si) at 0.01 C | $1^{st}$ cycle efficiency (100%) at 0.01 C | $1^{st}$ cycle discharge capacity (mAh/g Si) at 0.03 C | $1^{st}$ cycle efficiency (100%) at 0.03 C | Ratio of capacity at 0.03 C to capacity at 0.01 C |
|---|---|---|---|---|---|
| Si with metal-ligand complex* | 2605 | 64 | 2287 | 66 | 88 |
| Control | 2196 | 59 | 1281 | 57 | 58 |

*Data was based on the average of 3 replicate cells, and the mass loading of metal-ligand complex coated Si was 20-27% higher than that of the control.

Example 9: Fabrication and Testing of a Si Anode in Coin Cells Using Different Molecular Weight Binders This example compares the effect of different molecular weight polyacrylic acid binders (100 kD and 450 kD) on the charge/discharge cycling performance of a Si anode with metal-ligand complex. The procedures for making slurries, fabricating coin cells and testing coin cells were the same as shown in Examples 3 and 4. The data in Table 7 shows that higher molecular weight PAA binder worked better with the metal-ligand complex in terms of improving discharge capacity, charge/discharge efficiency and high-rate capacity retention. The PAA binder with higher molecular weight has more binding sites for binding with both metal-ligand complex and the Si particles, which results in multiple interactions and resultant stronger binding between the binder and Si particles. Thus, the molecular weight of binders influences, to an extent, efficiency and strength of the metal-ligand complex to stabilise the structure of the Si particles and improve the performance of the Si anode.

TABLE 7

Charge/discharge cycling data for metal-ligand complex coated Si with different molecular weight PAA binder and the control with 450k-PAA

| Comparison | Si with metal-ligand complex* 450k-PAA | Si with metal-ligand complex* 100k-PAA | Control* 450k-PAA |
|---|---|---|---|
| $1^{st}$ cycle capacity at 0.01 C (mAh/g Si) | 2605 | 2284 | 2196 |
| $1^{st}$ cycle efficiency at 0.01 C (%) | 64 | 61 | 59 |
| $1^{st}$ cycle capacity at 0.5 C (mAh/g Si) | 2003 | 913 | 733 |
| Capacity retention at 0.5 C/0.01 C (%) | 77 | 40 | 33 |

*Data was based on the average of 3 replicate cells, and the mass loading of Si anode with metal-ligand complex was 25% higher than that of the control.

Example 10: Fabrication and Testing of a Si Anode in Coin Cells Using Different Binders This example compares the effect of polyacrylic acid (PAA) and polyvinyl alcohol (PVA) binders on the charge/discharge cycling performance of a Si anode coated with metal-ligand complex. The procedures for making slurries, fabricating coin cells and testing coin cells were the same as shown in Examples 2, 3 and 4. The data in Table 8 shows that the PVA binder had similar or slightly better charge/discharge performance as compared to the PAA binder at a similar molecular weight. This example also shows that metal-ligand complex works with different polymer binders to improve the charge/discharge performance of Si anode. From Examples 9 and 10, it can be seen that selection of both type and molecular weight of binders can be used to positively combine with the use of metal-ligand complexes.

TABLE 8

Charge/discharge cycling data for metal-ligand complex coated Si with different binder (PAA and PVA) and the control with PAA binder

| Comparison | Si with metal-ligand complex* 100k-PAA | Si with metal-ligand complex* 98k-PVA | Control* 450k-PAA |
|---|---|---|---|
| $1^{st}$ cycle capacity at 0.01 C (mAh/g Si) | 2284 | 2531 | 2196 |
| $1^{st}$ cycle efficiency at 0.01 C (%) | 61 | 69 | 59 |
| $1^{st}$ cycle capacity at 0.5 C (mAh/g Si) | 913 | 1008 | 733 |
| $1^{st}$ cycle efficiency at 0.5 C (%) | 79 | 83 | 79 |

TABLE 8-continued

Charge/discharge cycling data for metal-ligand
complex coated Si with different binder (PAA
and PVA) and the control with PAA binder

| Comparison | Si with metal-ligand complex* 100k-PAA | Si with metal-ligand complex* 98k-PVA | Control* 450k-PAA |
|---|---|---|---|
| Capacity retention at 0.5 C/0.01 C (%) | 40 | 40 | 33 |

*Data was based on the average of 3 replicate cells, and the mass loading of Si anode with metal-ligand complex was 25% higher than that of the control.

Example 11: Fabrication and Testing of a Si Anode Using Different Order of Addition of Metal-Ligand Complex This example compares the effect of different order of addition of metal-ligand complex on the charge/discharge cycling performance of a Si anode. The procedures for making slurries, fabricating coin cells and testing coin cells were the same as shown in Examples 2, 3 and 4. Three different orders of addition of metal-ligand complex and the control without metal-ligand complex were compared. Si activation was carried out by coating Si particles using the 50 mM/2 wash metal-ligand complex procedure, premix (Si+SPC) was done with pre-mixing Si and SPC particles first and then adding 4 mM metal-ligand complex, and SPC activation was performed by coating SPC particles using the 50 mM/2 wash metal-ligand complex procedure. The data in Table 9 shows that optimum performance in terms of improving discharge capacity, charge/discharge efficiency and high-rate capacity retention using metal-ligand complexes is also controllable by the order in which the composite active material is formed.

TABLE 9

Charge/discharge cycling data for Si with different order of addition
of metal-ligand complex and the control without metal-ligand complex.

| Comparison | Si with metal-ligand complex* Si activation, 50 mM/2wash | Si with metal-ligand complex* Premix (Si + SPC) 4 mM/0wash | Si with metal-ligand complex* SPC activation, 50 mM/2wash | Control* |
|---|---|---|---|---|
| 1st cycle capacity at 0.01 C (mAh/g Si) | 2605 | 1824 | 1961 | 2196 |
| 1st cycle efficiency at 0.01 C (%) | 64 | 53 | 56 | 59 |
| 1st cycle capacity at 0.5 C (mAh/g Si) | 2003 | 857 | 826 | 733 |
| Capacity retention at 0.5 C/0.01 C (%) | 77 | 47 | 42 | 33 |

*Data was based on the average of 3 replicate cells, and the mass loading of Si anode with metal-ligand complex was 25% higher than that of the control.

Example 12: Fabrication and Testing of a Si Anode in Coin Cells Using Different Metal-Ligand Complexes In this example, the influence of the different anions (Cl vs $ClO_4$) present in the different metal-ligand complex was investigated. Two different metal-ligand complexes (Solutions 1 and 3), as described in Example 1, were used to coat 100 nm Si particles and the procedures for making slurries, fabricating coin cells and testing coin cells were the same as shown in Examples 2 and 3. The data in Table 10 shows that the $CrCl_3$ based metal-ligand complex had a similar performance at 0.03 C as the $Cr(ClO_4)_3$ based in terms of discharge capacity and coulombic efficiency, and both showed better performance than the Control. When the charge/discharge rate increased to 0.5 C, the $Cr(ClO_4)_3$ based metal-ligand complex exhibited better performance than the $CrCl_3$ based in terms of discharge capacity and capacity retention. This shows the use of the metal-ligand complexes, while varying with choice of counter-ion, is not dependent thereon to achieve improvements in anode performance.

TABLE 10

Charge/discharge cycling data for Si with different
metal-ligand complexes and the control

| Comparison | Si with metal-ligand complex* $Cr(ClO_4)_3$ | Si with metal-ligand complex* $CrCl_3$ | Control |
|---|---|---|---|
| $1^{st}$ cycle capacity at 0.03 C (mAh/g Si) | 2241 | 2217 | 1652 |
| $1^{st}$ cycle efficiency at 0.03 C (%) | 71 | 71 | 61 |
| $2^{nd}$ cycle capacity at 0.03 C (mAh/g Si) | 2268 | 2229 | 1597 |
| $2^{nd}$ cycle efficiency at 0.03 C (%) | 94 | 93 | 91 |
| $1^{st}$ cycle capacity at 0.5 C (mAh/g Si) | 1352 | 800 | 624 |
| $1^{st}$ cycle efficiency at 0.5 C (%) | 91 | 89 | 82 |
| Capacity retention (%) 0.5 C/0.03 C | 61 | 36 | 38 |

Example 13: Testing Faster Activation at 0.1 C with Si Anode in Coin Cells

Activation/formation by charge/discharge is an important step in manufacturing battery cells. With Si anode based batteries, very low charge/discharge rates (lower than 0.1 C) are normally needed for the activation of the batteries because of the high resistance associated with the Si anode.

From a viewpoint of battery manufacturing, faster activation would be preferred as it can shorten the battery formation time and reduce the manufacturing cost.

Figure 7:
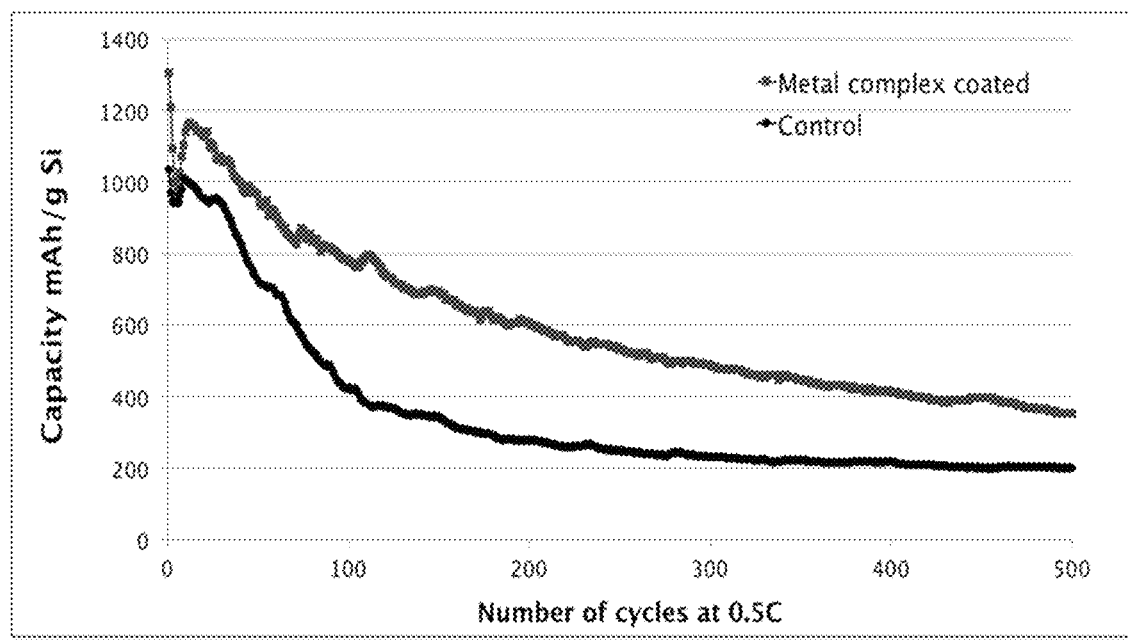
FIG. 7: Graph showing 0.5 C charge/discharge cycling stability of metal-ligand complex coated Si and the Control after 0.1 C activation

This example investigated the feasibility of activating a Si anode based coin cell at a charge/discharge rate of 0.1 C and compared the 0.5 C cycling performance of Si cells with and without metal-ligand complex after 0.1 C activation. The procedures for making slurries and fabricating coin cells were the same as shown in Examples 3 and 4. For the charge/discharge cycling tests, the coin cells were activated at 0.1 C (1 C=4,200 mAh/g) for 2 cycles and then cycled at 0.5 C (1 C=4,200 mAh/g) for long-term stability testing. The C rates were based on the mass of Si particles in the electrodes. The voltage range for charge/discharge tests was 0.005-1.50 V vs. Li. FIG. 7 shows the comparison of the long-term cycling stability at 0.5 C for metal-ligand complex coated Si and the control after 0.1 C activation. It can be seen that the Si anode activated at a faster rate of 0.1 C and exhibited similar performance as those activated at slower rates (0.03 C in FIG. 3). The cycling stability tests also show that the metal-ligand complex coated Si had superior long-term stability and the capacity of the metal-ligand complex coated Si was still significantly higher than that of the Control after 500 deep cycles (100% DOD—depth of discharge) at 0.5 C (1 C=4,200 mAh/g).

Example 14: Fabrication and Testing of a Metal Oxide Cathode with & without Metal-Ligand Complex in Coin Cells Using PVDF/NMP Based Processing To investigate the effects of metal-ligand complex on stabilising the performance of a metal oxide cathode, lithium mixed metal oxide particles were coated with metal-ligand complex and electrodes and coin cells were fabricated for charge/discharge cycling tests.

Lithium mixed metal oxide particles were purchased from MTI Corporation in the USA with a composition of Li(Ni-CoMn)$O_2$ (Ni:Co:Mn=1:1:1). The procedures for coating the metal oxide particles with the metal-ligand complex were the same as described in Example 2-A. For mixing slurries, polyvinylidene fluoride (PVDF) was used as a binder, N-methyl-2-pyrrolidone (NMP) as a solvent and super-C45 carbon as a conductor which were all purchased from MTI Corporation. The ratio of oxide:super-C45:PVDF was 85:7:8 (wt %). The procedures for mixing slurries were the same as described in Example 3-A.

The metal oxide slurries were sent for electrode fabrication and coin cell assembly. The slurries were casted onto aluminum (Al) foil which was used as the current collector to form the electrode. The casted electrode was then dried under vacuum, calendered and cut for coin cell assembly. An electrode with uncoated metal oxide as the active material was fabricated and used as a control which had similar mass loadings (~13 mg/$cm^2$) as the metal-ligand complex coated electrode. Lithium (Li) metal was used as the counter electrode, and 1M LiPF$_6$/EC:DEC:DMC=1:1:1 was used as electrolyte for coin cell assembly. For charge/discharge cycling tests, the coin cells were activated at 0.10 (1 C=150 mAh/g) for 3 cycles and then cycled at 0.50 (1 C=150 mAh/g) for long-term stability testing. The C rates were based on the mass of metal oxide particles in the electrodes. The voltage range for charge/discharge tests was 2.5-4.2 V vs. Li. The charge/discharge tests were conducted on Neware multi-channel battery testers controlled by a computer. Three replicate cells were made and tested for each condition.

Figure 8:
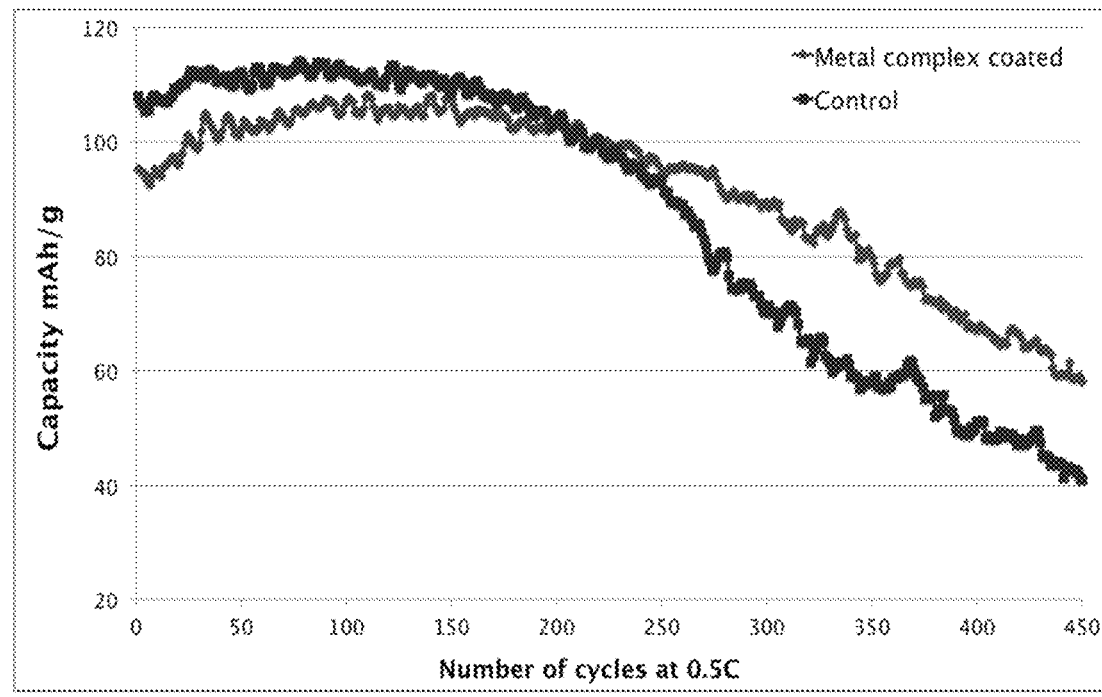
FIG. 8: Graph showing long term cycling stability of metal-ligand complex coated metal oxide cathodes compared to those without metal-ligand complexes (Control).

FIG. 8 shows the comparison of the long-term cycling profiles for the metal-ligand complex coated metal oxide cathode and the Control. In this example, the first 100-150 cycles has the Control at slightly higher discharge capacities than the metal-ligand complex coated cathode, which could likely be addressed by further optimization of coating conditions for more efficient lithium ion diffusion. After 200 cycles, the metal-ligand complex coated cathode started showing significant improvement in stability over the Control. After 450 deep cycles (100% DOD—depth of discharge) at 0.5 C, the capacity of the metal-ligand complex coated cathode was still significantly higher than that of the Control. The improvement in cycling stability with metal-ligand complex is believed to be due to its effects in suppressing structural changes and/or reducing dissolution of metal elements into the electrolyte as a result of metal-ligand complex coatings on the metal oxide particles.

Example 15: Fabrication and Testing of a Metal Oxide Cathode with & without Metal-Ligand Complex in Coin Cells Using Aqueous Binder Based Processing Organic solvent based processing is widely used in the Li-ion battery industry to fabricate metal oxide cathodes. But in terms of cost and environmental friendliness, aqueous processing with water-soluble binders is much more preferred. This example investigated the compatibility of metal-ligand complex with aqueous binder based processing to fabricate a cathode and the effects of metal-ligand complex on stabilising the performance of the resulting metal oxide cathode.

Figure 9:
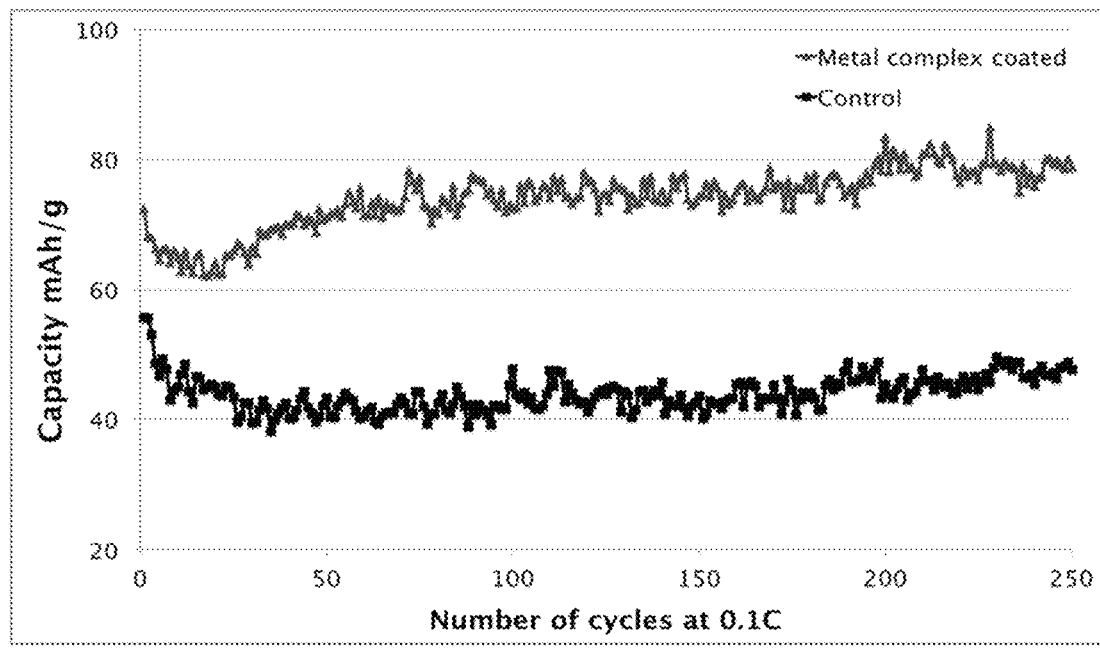
FIG. 9: Graph showing long term cycling stability of metal-ligand complex coated metal oxide cathodes using aqueous binders compared to those without metal-ligand complexes (Control).

Poly (acrylic acid) (PAA) with a molecular weight of 450,000 Dalton was purchased from Sigma-Aldrich and used as an aqueous binder to mix metal oxide slurries. The procedures for making slurries, fabricating coin cells and testing coin cells were the same as shown in Example 14. Table 11 summarises the data of the charge/discharge cycling tests for the metal-ligand complex coated metal oxide cathode and the control, and FIG. 9 shows the comparison of the long-term cycling stability for the metal-ligand complex coated cathode and the control. The data shows that the metal-ligand complex coated cathode had higher discharge capacities and better capacity retention at increased charge/discharge rates. The cycling stability tests show that the metal-ligand complex coated cathode had better stability than the control and the capacity of the metal-ligand complex coated cathode was still significantly higher than that of the control after 250 deep cycles (100% DOD—depth of discharge) at 0.1 C (1 C=150 mAh/g).

TABLE 11

Charge/discharge cycling data for metal oxide cathode with metal-ligand complex and the control

| Comparison | Cathode with metal-ligand complex | Cathode control |
|---|---|---|
| $1^{st}$ cycle capacity at 0.02 C (mAh/g) | 104 | 92 |
| $1^{st}$ cycle efficiency at 0.02 C (%) | 87 | 91 |
| $2^{nd}$ cycle efficiency at 0.02 (%) | 99 | 99 |
| $1^{st}$ cycle capacity at 0.1 C (mAh/g) | 72 | 56 |
| $1^{st}$ cycle efficiency at 0.1 C (%) | 85 | 83 |

TABLE 11-continued

Charge/discharge cycling data for metal oxide cathode
with metal-ligand complex and the control

| Comparison | Cathode with metal-ligand complex | Cathode control |
|---|---|---|
| Capacity retention (%, 0.1 C/0.02 C) | 70 | 61 |

Example 16: Fabrication and Testing of a Si Anode in Supercapacitors with Activated Carbon (AC) as Cathode This example is on fabrication of supercapacitors using a Si anode and activated carbon (AC) as the cathode and investigation of the effects of metal-ligand complex coatings on the electrochemical performance of Si-AC supercapacitors.

The Si particles were coated using 50 mM metal-ligand complex with 2 washes, as described in Example 3. The slurry mixing procedure was the same as described in previous examples and the ratio of Si:Super-P:PAA was set at 40:40:20 (wt %). Ball milling was used to process the Si slurries with & without metal-ligand complex. The procedures for fabricating the Si electrodes were the same as described in previous examples. 90% activated carbon (AC, Norit 30) was mixed with 10% PVDF binder using NMP as solvent to form the cathode slurry and then the slurry was casted onto Al foil to form the cathode. The AC electrode was then dried under vacuum, calendered and cut for coin cell assembly. The mass loading of the Si electrode was controlled at 0.32-0.76 mg/cm$^2$, and the mass loading of the AC electrode was controlled at 3.69-8.73 mg/cm$^2$. To assemble the coin cells, the AC electrode was used as the cathode and Si as anode, and 1M LiPF$_6$/EC:DEC:DMC (1:1:1) with 10% FEC was used as electrolyte. For charge/discharge cycling tests, the coin cells were activated at a current density of 0.08 A/g for 3 cycles, which was about 2.0 C based on the total mass of active materials on both anode and cathode. After the activation, the coin cells were cycled at 20 C and 60 C, respectively for long-term stability testing. The voltage range for charge/discharge tests was 2.0-4.5 V.

Figure 10:
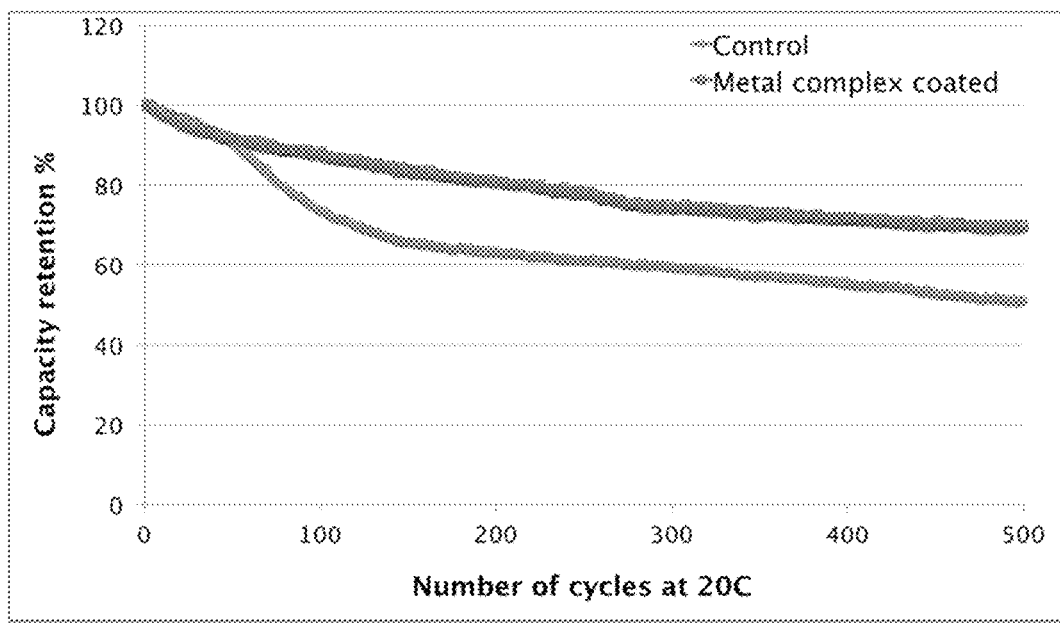
FIG. 10: Graph showing supercapacitor charge/discharge cycling stability of metal-ligand complex coated Si based cells compared to those without metal-ligand complexes (Control) at 20 C.
Figure 11:
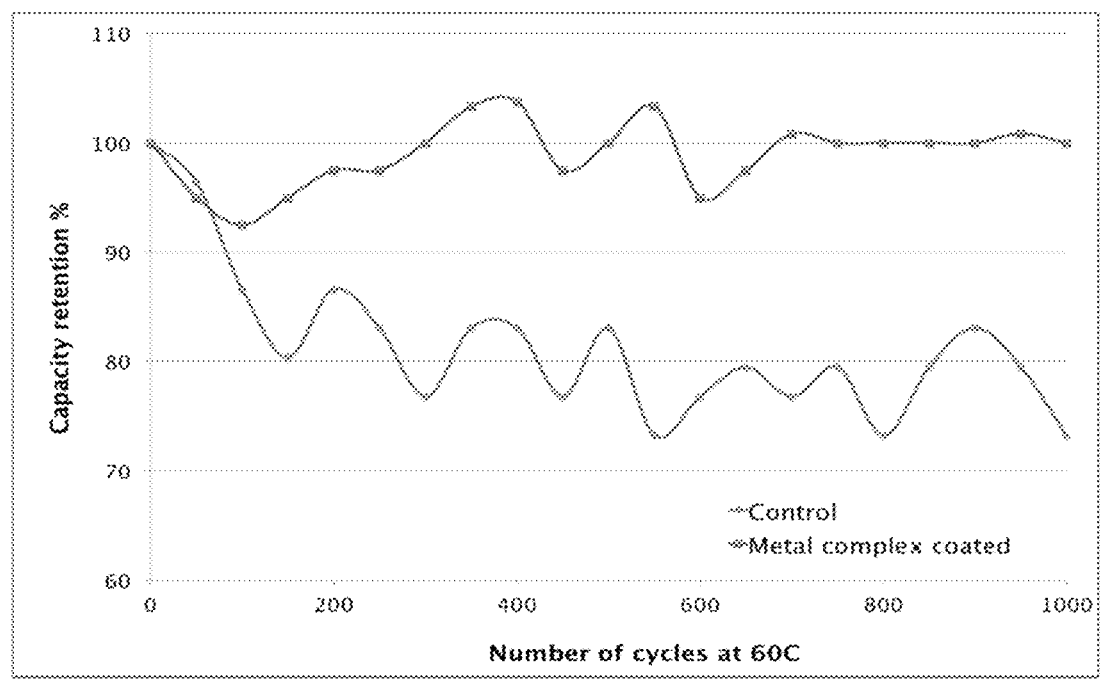
FIG. 11: Graph showing supercapacitor charge/discharge cycling stability of metal-ligand complex coated Si based cells compared to those without metal-ligand complexes (Control) at 60 C.

FIGS. 10 and 11 show the comparison of the long-term cycling stability at 20 C (for 500 cycles) and 60 C (for 1,000 cycles), respectively for Si-AC cells with metal-ligand complex coated Si and the Control. The data shows that the charge/discharge cycling stability of Si-AC cells was significantly enhanced by using metal-ligand complex coated Si. After 1000 deep charge/discharge cycles (100% DOD) at 20 C and 10,000 deep charge/discharge cycles (100% DOD) at 60 C, the capacity retention of the metal-ligand complex coated Si based cells was significantly higher than that of the Control.

The invention claimed is:

1. An electrode including:
an active material having a surface; and
a metal-ligand complex associated with the active material surface, the metal-ligand complex including at least one ligand datively bonded to a metal ion;
wherein the metal ion is associated with the active material surface through a dative bond.

2. The electrode of claim 1, wherein the surface is encapsulated by a layer of the metal-ligand complex.

3. The electrode of claim 2, wherein the layer of the metal-ligand complex is less than about 1000 nm thick.

4. The electrode of claim 1, further including a second active material and wherein a surface of the second active material is not associated with the metal-ligand complex.

5. The electrode of claim 4 wherein the second active material is carbon.

6. The electrode of claim 1, wherein the metal of the metal-ligand complex is selected from the group consisting of chromium, ruthenium, iron, cobalt, aluminum, zirconium, and rhodium.

7. The electrode of claim 1, wherein the ligand includes a dative bond forming atom selected from nitrogen, oxygen, or sulfur datively bonded to the metal ion.

8. The electrode of claim 1, wherein the ligand is a mono-, di-, or tri-atomic ligand.

9. The electrode of claim 8, wherein the ligand is an oxygen containing species and wherein the dative bond is formed between an oxygen atom and the metal ion.

10. The electrode of claim 1, wherein the ligand is a bridging compound that is datively bonded to at least two metal ions.

11. The electrode of claim 1, wherein the metal-ligand complex is an oxo-bridged chromium (III) complex.

12. The electrode of claim 1, wherein the active material surface is an oxide surface.

13. The electrode of claim 1, wherein the active material is selected from the group consisting of metals, intermetallic compounds, metalloids, and carbon.

14. The electrode of claim 13, wherein the active material is selected from the group consisting of silicon, silicon containing materials including silicon oxides, composites and alloys, tin, a tin containing material including tin oxides, composites and alloys, germanium, a germanium containing material including germanium oxides, composites and alloys, carbon, graphite, sulfur, LiFePO4 (LFP), and mixed metal oxides which include one or more of cobalt, lithium, nickel, iron and manganese.

15. The electrode of claim 13, wherein when the electrode is an anode the active material is selected from the group consisting of silicon and carbon.

16. The electrode of claim 13, wherein when the electrode is a cathode the active material is selected from the group consisting of LiFePO4 (LFP), and mixed metal oxides which include one or more of cobalt, lithium, nickel, iron and manganese.

17. An electrochemical cell including:
an anode,
a cathode, and
an electrolyte arranged between the anode and the cathode;
wherein at least one of the anode and the cathode is an electrode according to claim 1.

18. A method for fabricating an electrode including:
forming a precursor composition including an active material, and
fabricating an electrode from the precursor composition,
wherein the method includes contacting a metal-ligand complex with a surface of the active material, the metal-ligand complex including at least one ligand datively bonded to the metal ion, and
wherein the method further includes associating the metal ion with the active material surface through a dative bond.

19. The method of claim 18, wherein the step of fabricating the electrode includes casting the electrode from the precursor composition.

20. An electrode including:
an active material having a surface wherein the active material is selected from the group consisting of silicon, silicon containing materials including silicon oxides, composites and alloys, tin, a tin containing material including tin oxides, composites and alloys, germanium, a germanium containing material including germanium oxides, composites and alloys, carbon, graphite, $LiFePO_4$ (LFP), and mixed metal oxides which include one or more of cobalt, lithium, nickel, iron and manganese; and
a metal-ligand complex associated with the active material surface, the metal-ligand complex including at least one ligand datively bonded to a metal ion and wherein the metal of the metal-ligand complex is selected from the group consisting of chromium, ruthenium, iron, cobalt, aluminium, titanium, zirconium, and rhodium;
wherein the metal ion is associated with the active material surface through a dative bond.

21. The electrode of claim 20, further including a second active material and wherein a surface of the second active material is not associated with the metal-ligand complex.

22. The electrode of claim 21, wherein the metal of the metal-ligand complex is chromium.

* * * * *